(12) United States Patent
Brassitos et al.

(10) Patent No.: US 10,250,101 B2
(45) Date of Patent: Apr. 2, 2019

(54) GEAR STABILIZATION TECHNIQUES

(71) Applicant: NORTHEASTERN UNIVERSITY, Boston, MA (US)

(72) Inventors: Elias Brassitos, Boston, MA (US); Brian Weinberg, San Diego, CA (US); Qingchao Kong, Revere, MA (US); Constantinos Mavroidis, Arlington, MA (US)

(73) Assignee: Northeastern University, Boston, MA (US)

( * ) Notice: Subject to any disclaimer, the term of this patent is extended or adjusted under 35 U.S.C. 154(b) by 238 days.

(21) Appl. No.: 15/316,567

(22) PCT Filed: Jun. 8, 2015

(86) PCT No.: PCT/US2015/034707
§ 371 (c)(1),
(2) Date: Dec. 6, 2016

(87) PCT Pub. No.: WO2015/188187
PCT Pub. Date: Dec. 10, 2015

(65) Prior Publication Data
US 2017/0201154 A1 Jul. 13, 2017

Related U.S. Application Data

(60) Provisional application No. 62/008,567, filed on Jun. 6, 2014.

(51) Int. Cl.
*H02K 7/10* (2006.01)
*H02K 7/116* (2006.01)
(Continued)

(52) U.S. Cl.
CPC .............. *H02K 7/116* (2013.01); *B25J 9/102* (2013.01); *F16C 19/546* (2013.01);
(Continued)

(58) Field of Classification Search
CPC ........ H02K 7/09; H02K 7/116; H02K 7/1163; H02K 7/1166; H02K 11/215; H02K 9/102
(Continued)

(56) References Cited

U.S. PATENT DOCUMENTS 4,873,894 A 10/1989 Avery et al.
5,120,285 A * 6/1992 Grimm ................... B64C 13/28
475/205
(Continued)

OTHER PUBLICATIONS

International Search Report and Written Opinion of PCT/US15/034707; dated Oct. 23, 2015; 10 pages.

*Primary Examiner* — Nguyen Tran

(57) ABSTRACT

A balanced planetary gearbox including an assembly having an input stage and an output stage. The assembly includes two grounds, each with ground rollers and ground rings. The two grounds are fixedly attached to one another. The assembly includes a sun gear and planet sub-assemblies between the two grounds. The planet sub-assemblies include at least one input planet gear and one output planet gear. The sun gear and the input planet gears include rollers. An abutment of rollers in the gearbox keeps the sun gear and the planet gears in alignment. The output gear meshes with an output ring disposed in between the two ground rings, such that a combination of the at least one input planet gears from each of the plurality of planet sub-assemblies provides a structural symmetry to the planetary gearbox.

25 Claims, 27 Drawing Sheets

(51) Int. Cl.
*F16H 1/28* (2006.01)
*H02K 5/20* (2006.01)
*H02K 9/22* (2006.01)
*H02K 9/10* (2006.01)
*H02K 11/215* (2016.01)
*B25J 9/10* (2006.01)
*F16C 19/54* (2006.01)
*F16H 57/08* (2006.01)

(52) U.S. Cl.
CPC ............ *F16C 19/548* (2013.01); *F16H 1/28* (2013.01); *H02K 5/20* (2013.01); *H02K 9/10* (2013.01); *H02K 9/22* (2013.01); *H02K 11/215* (2016.01); *F16C 2361/65* (2013.01); *F16H 2001/2872* (2013.01); *F16H 2057/085* (2013.01); *Y10S 901/25* (2013.01)

(58) Field of Classification Search
USPC ..... 310/46, 47, 50, 74, 75, 83, 90, 90.5, 98, 310/99, 100
See application file for complete search history.

(56) References Cited

U.S. PATENT DOCUMENTS

| | | | |
|---|---|---|---|
| 8,864,621 B2 * | 10/2014 | Phebus | ................. F16H 1/2818 475/346 |
| 2008/0045374 A1 | 2/2008 | Weinberg et al. | |
| 2012/0028748 A1 * | 2/2012 | Burgman | ........... F16H 57/0479 475/159 |
| 2013/0337957 A1 | 12/2013 | Vranish | |

* cited by examiner

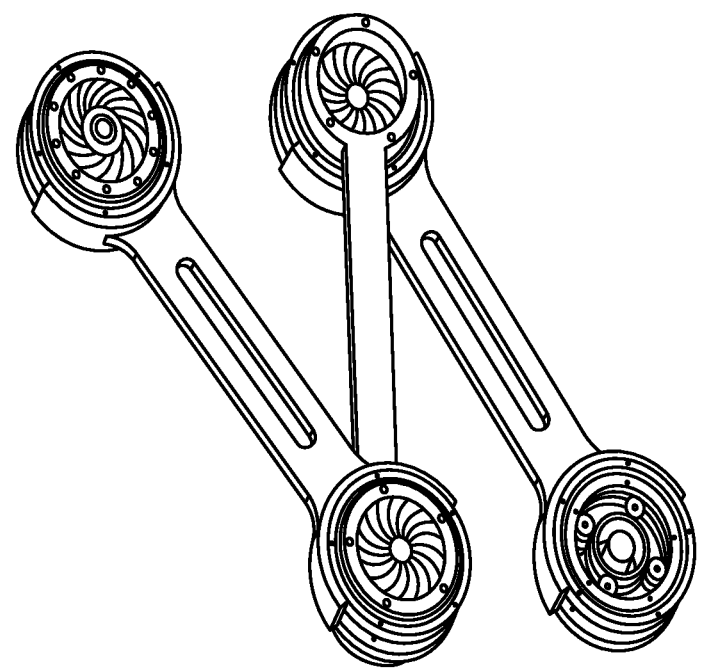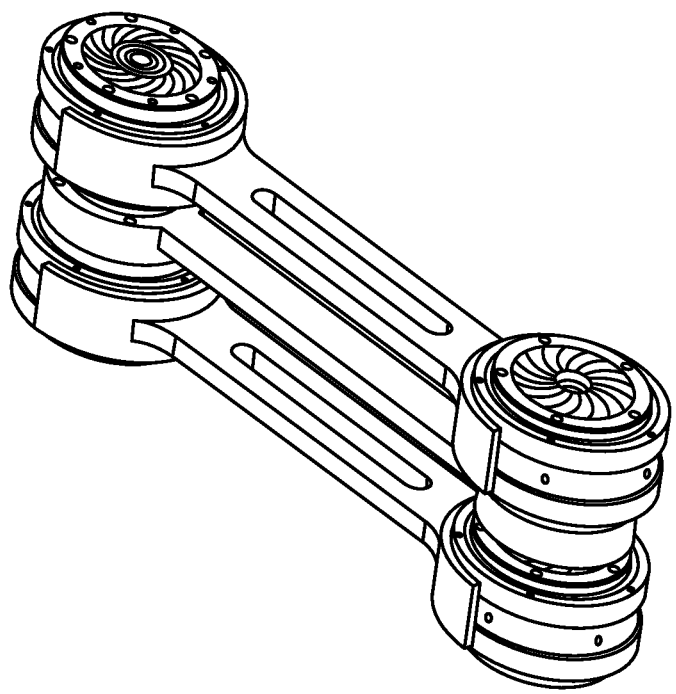
FIG. 18

| | A | B | C | D | E | F | G | H | I | J | K | L | M | N | O |
|---|---|---|---|---|---|---|---|---|---|---|---|---|---|---|---|
| COMBINATIONS | -1815 | 0.25 | 0 | 2.5 | 2.00 | 37.12 | 191 | 0.9366 | 24 | 20 | 31 | 64 | 99 | 25.6235 | 39.60 |
| | -1716 | 0.25 | 0 | 2.5 | 2.00 | 38.47 | 205 | 0.7343 | 15 | 18 | 23 | 51 | 65 | 20.4286 | 26.00 |
| | -1664 | 0.25 | 0 | 2.5 | 2.00 | 31.32 | 166 | 0.7422 | 22 | 26 | 31 | 74 | 88 | 29.6421 | 35.20 |
| | -1547 | 0.25 | 0 | 2.5 | 2.00 | 47.42 | 158 | 1.0407 | 20 | 14 | 19 | 48 | 65 | 19.2174 | 26.00 |
| | . | . | . | . | . | . | . | . | . | . | . | . | . | . | . |
| | . | . | . | . | . | . | . | . | . | . | . | . | . | . | . |
| | +1764 | 0.25 | 0 | 2.5 | 2.00 | 40.38 | 213 | 0.7937 | 26 | 28 | 31 | 82 | 91 | 32.76 | 36.4 |

| | | |
|---|---|---|
| A: GEAR RATIO | F: MAX OUTPUT TORQUE [Nm] | K: SUN 1 TEETH |
| B: FACE WIDTH [in] | G: TORQUE DENSITY [Nm/kg] | L: RING 1 TEETH |
| C: OUTPUT SPEED [RPM] | H: MAX MOTOR DIAMETER [in] | M: RING 2 TEETH |
| D: OUTPUT PITCH DIAMETER [in] | I: PLANET 1 TEETH | N: STAGE 1 DIAMETRAL PITCH [in$^{-1}$] |
| E: SAFETY FACTOR | J: PLANET 2 TEETH | O: STAGE 2 DIAMETRAL PITCH [in$^{-1}$] |

FIG. 19

| | |
|---|---|
| GEAR RATIO | 900 |
| GROUND STAGE DIAMETRAL PITCH | 24/1.45 |
| OUTPUT STAGE DIAMETRAL PITCH | 23/1.45 |
| GROUND PLANET NUMBER OF TEETH | 12 |
| OUTPUT PLANET NUMBER OF TEETH | 11 |
| SUN GEAR NUMBER OF TEETH | 38 |
| GROUND RING GEAR NUMBER OF TEETH | 62 |
| OUTPUT RING GEAR NUMBER OF TEETH | 57 |
| SUN GEAR PITCH DIAMETER | 2.203 in |
| GROUND PLANET PITCH DIAMETER | 0.695 in |
| OUTPUT PLANET PITCH DIAMETER | 0.692 in |
| GROUND RING PITCH DIAMETER | 3.595 in |
| OUTPUT RING GEAR PITCH DIAMETER | 3.592 in |
| PEAK OUTPUT TORQUE | 300 Nm |
| CONTINUOUS TORQUE | 250 Nm |
| CONTINUOUS SPEED | 4.5 RPM |

FIG. 23

GEAR STABILIZATION TECHNIQUES

CROSS REFERENCE TO RELATED APPLICATIONS

This application claims benefit under 35 U.S.C. § 119(e) of U.S. Provisional Application No. 62/008,567, filed Jun. 6, 2014, the disclosure of which is incorporated by reference herein.

This application is related to International Application No. PCT/US2014/031566, filed Mar. 24, 2014, entitled "Curved Bearing Contact System," the disclosure of which is incorporated by reference herein.

International Application No. PCT/US2014/031566 claims benefit of U.S. Provisional Application No. 61/804,256, filed Mar. 22, 2013 and U.S. Provisional Application No. 61/913,635, filed Dec. 9, 2013, the disclosures of which are incorporated by reference herein.

This application is related to U.S. application Ser. No. 11/821,095, entitled "Gear Bearing Drive," filed Jun. 21, 2007, which issued as U.S. Pat. No. 8,016,893, the disclosure of which is incorporated by reference herein.

U.S. application Ser. No. 11/821,095 claims benefit under 35 U.S.C. § 119(e) of U.S. Provisional Application No. 60/815,313, filed Jun. 21, 2006, the disclosure of which is incorporated by reference herein.

TECHNICAL FIELD OF THE INVENTION

This invention relates to an gear stabilization techniques and its use in a variety of systems, including a planetary gear system and a gear bearing drive.

BACKGROUND OF THE INVENTION

In designing advanced compact actuators, there is a need for miniaturized devices and instruments that can apply substantial forces. Actuator requirements are becoming more stringent in terms of mass, dimensions, power and cost. Improvements in actuator robustness and reliability associated with power efficiency and compact packaging can lead to effective devices that are significantly more capable and reliable at a lower cost.

The development of high performance and efficient powertrains (actuator and transmission) can be necessary to meet the radical design requirements of demanding next generation robotic systems, particularly in space robotics where weight, efficiency and compact forms are decisive for the application functionality (e.g., space manipulator joints, powered bionics; humanoid manipulators; space exercise devices for astronauts). Such robotic applications require a new breed of actuators that have compact, configurable hardware and inherent mechanical compatibility and adaptability to robotic manipulation.

Previously, actuators have been dominated by the Harmonic Drives, which offer compact mechanisms with high-speed reductions. During the past 30 years, the use of Harmonic Drive transmissions in conjunction with high performance electric motors has been the state of the art for actuated joints in robotics. Harmonic Drives are primarily useful to develop compact, high torque outputs actuators. These actuated joints can have little to no backlash and require only a one-time dry lubrication, making them ideal for a wide variety of applications. The principle of operation of Harmonic Drives is based on a unique type of transmission mechanism comprising three concentric components, denoted by the Wave Generator, Flexpline, and Circular Spline. The Wave Generator consists of a bearing that is press fitted within an elliptically shaped steel disk and inserted within the Flexpline. The Flexpline is a compliant thin-walled steel cup that conforms to the shape of the wave generator, and has teeth on its external diameter that mates with the Circular Spline. The Circular Spline consists of a rigid steel ring with teeth on the internal diameter and represents the output. Harmonic Drives are designed such that the Flexpline has two teeth less than the Circular Spline, so that when the Wave Plug rotates one revolution, the Circular Spline is shifted by two teeth yielding very high torque advantages. However research on Harmonic Drives has shown that it can exhibit large non-linear behavior under high dynamic loads due to its flexible gear component being in series inside the transmission. This elastic element creates a low stiffness medium inside the transmission, which deforms under load in a way similar to backlash. The elastic component also introduces instabilities under high gain feedback loops that further deteriorate the control system performance of the actuated joint. Additionally, Harmonic Drives are only transmission systems and require specialty motors to perform as actuators.

Several other actuator systems involving high performance brushless motors in combination with high gear-ratio planetary gearheads have been used in an attempt to reduce size, cost and manufacturing complexity. Overall, most of these actuators are still too large because the motor is connected serially to the planetary gearbox and not integrated within the gearbox (also referred to herein as actuator). Some work has been performed to reduce the size of the assembly of the serially connected brushless DC motor and of the planetary gears. For example, a compact inner rotor slotless brushless DC motor serially connected to a single stage planetary gearheads has been developed. However, the resultant actuator can only exhibit low-reduction ratio at 1/5 and lacks the ability to generate high amount of torque that is often desired in robotics. Another example is a slotless type brushless DC motor that is integrated with a planetary gearhead to function as a robotic actuator. The system attempts to reduce the cogging of the brushless DC motor by optimizing the number of gear teeth integrated on the stator and tooth-to-pole ratio. Efficiencies of 80 to 85% have been realized for 90 W of power output, and the backlash ranged from 50 to 20 arc-min. A major limitation of these devices has been the inability to generate high amount of torque larger than 20 Nm that is often desired in robotics, and exhibited relative higher backlash compared to Harmonic Drives.

SUMMARY

In some embodiments of the present disclosure, a balanced planetary gearbox is disclosed including an assembly having an input stage and an output stage. In some embodiments, the assembly comprises a first ground, the first ground including a first ground ring and a first ground ring roller. In some embodiments, the assembly comprises a second ground, the second ground including a second ground ring and a second ground ring roller, the second ground fixedly connected to the first ground. In some embodiments, the assembly comprises a sun gear sub-assembly disposed between the first ground and the second ground, the sun gear sub-assembly including a sun gear and a sun roller, the sun gear including a first plurality of sun gear teeth and a second plurality of sun gear teeth. In some embodiments, the assembly comprises a plurality of planet sub-assemblies disposed to interface with and revolve around the sun gear sub-assembly and within the first ground ring and the second ground ring, each planet sub-assembly comprising at least one input planet gear and one output planet gear, each of the input gears including input gear teeth meshing with at least the first plurality of sun gear teeth or the second plurality of sun gear teeth, the at least one input planet gear including an input planet roller, the output gear coupled with at least one input planet gear, the output gear disposed in between the first plurality of sun gear teeth and the second plurality of sun gear teeth, wherein the first and second ring rollers abut their respective input gear rollers and the sun roller. In some embodiments, the assembly comprises an output ring disposed to mesh with the output planet gear of each planet sub-assembly, the output ring gear disposed in between the first ground ring and the second ground ring, such that a combination of the input planet gears from each of the plurality of planet sub-assemblies provides a structural symmetry to the planetary gearbox.

In some embodiments, the second ground is fixedly connected to the first ground by a central shaft. In some embodiments, the second ground is fixedly connected to the first ground by a clamp external to the planetary gearbox. In some embodiments, the sun gear sub-assembly further comprises a motor having an external rotor and motor coils with an air gap defining a distance between the external rotor and the motor coils, the external rotor disposed inside an interior region of the sun gear and concentrically surrounded by the first plurality of sun gear teeth and the second plurality of sun gear teeth, the sun gear rotatable with the external rotor. In some embodiments, the motor coils are affixed to an exterior of the central shaft. In some embodiments, the motor coils are affixed to the first ground.

In some embodiments, the assembly further comprises a first bearing disposed between the output gear and the first ground and a second bearing disposed between the output gear and the second ground such that the output gear is constrained by the two bearings in a radial direction and a thrust direction. In some embodiments, the first bearing and the second bearing comprise at least one of angular-angular bearings, taper-taper bearings, taper-thrust bearings, and angular-thrust bearings. In some embodiments, the first bearing and the second bearing are pre-loaded. In some embodiments, the assembly further comprises a heat sink attached to the first ground plate. In some embodiments, each of the planet sub-assemblies includes a first input planet gear and a second input planet gear. In some embodiments, a diameter of the first input planet gear is substantially equal to the diameter of the second input planet gear.

In some embodiments, the balanced planetary gearbox is cylindrical and a diameter of the balanced planetary gearbox ranges from 2.5 inch to 6 inches and a height of the balanced planetary gearbox ranges from 1 inches to 3 inches. In some embodiments, the first ground ring is constrained by a first ground sleeve and the second ground ring is constrained by a second ground sleeve. In some embodiments, the first ground sleeve is attached to the first ground and the second ground sleeve is attached to the second ground. In some embodiments, the first ground ring is embedded in the first ground, and the second ground ring is embedded in the second ground. In some embodiments, the balanced planetary gearbox drive includes a sensing system to determine a position of the sun gear relative to the first ground. In some embodiments, the sensing system comprises a grating disk disposed on the sun gear and a sensor disposed on the first ground, the sensor configured to locate a position of the sun gear relative to the first ground by sensing a position signature of the grating disk. In some embodiments, the sensor is a Hall effect sensor. In some embodiments, the output ring actuates a link of a robotic arm. In some embodiments, the clamp can be connected to a robotic link.

In some embodiments, a balanced gear bearing drive is disclosed including an assembly having an input stage and an output stage. In some embodiments, the assembly comprises a first ground including a first ground plate, a first ground ring and a first ground roller, the first ground ring and the first ground roller disposed near a radially outward edge of the first ground plate. In some embodiments, the assembly comprises a second ground including a second ground plate, a second ground ring and a second ground roller, the second ground ring and the second ground roller disposed near a radially outward edge of the second ground plate, the second ground plate fixedly connected in parallel to the first ground plate by a central shaft. In some embodiments, the assembly comprises a sun gear sub-assembly, the sun gear sub-assembly located between the first ground plate and the second ground plate. In some embodiments, the sun gear sub-assembly comprises a sun gear including a first plurality of sun gear teeth and an associated first sun roller, and a second plurality of sun gear teeth and an associated second sun roller, the second plurality of sun gear teeth and the second sun roller parallel to the first plurality of sun gear teeth and the first sun roller, the first plurality of sun gear teeth and the second plurality of sun gear teeth extending radially outwardly and disposed circumferentially around the sun gear, and a motor having an external rotor and motor coils with an air gap defining a distance between the external rotor and the motor coils, the external rotor disposed inside an interior region of the sun gear and concentrically surrounded by the first plurality of sun gear teeth and the second plurality of sun gear teeth, the sun gear rotatable with the external rotor, and the motor coils affixed to the exterior of the central shaft. In some embodiments, the assembly comprises a plurality of planet sub-assemblies disposed to interface with and revolve around the sun gear sub-assembly and disposed to interface with and revolve within the first ground ring and the second ground ring. In some embodiments, each planet sub-assembly comprises a first input gear including a first plurality of input planet gear teeth and a first input planet roller, the first plurality of input planet gear teeth extending radially outwardly and disposed circumferentially around the first input gear, a second input gear including a second plurality of input planet gear teeth and a second input planet roller, the second plurality of input planet gear teeth extending radially outwardly and disposed circumferentially around the second input gear, the second input planet gear parallel to the first input planet gear, wherein the first plurality of input planet gear teeth meshes with the first plurality of sun gear teeth, and the second plurality of input planet gear teeth meshes with the second plurality of input planet gear teeth, and the first input planet roller contacts and is disposed in between the first sun roller and the first ground roller, and the second input planet roller contacts and is disposed in between the second sun roller and the second ground roller. In some embodiments, the assembly comprises an output planet gear, the output planet gear disposed in between the first input gear and the second input gear, the output planet gear including a plurality of output gear teeth and an output gear roller, the plurality of output planet gear teeth extending radially outwardly and disposed circumferentially around the output planet gear. In some embodiments, the assembly comprises an output ring disposed to mesh with the output planet gear of each planet sub-assembly, the output ring gear disposed in between the first ground ring and the second ground ring.

In some embodiments, a frictionless planetary carrier is disclosed comprising an assembly having an input side and an output side. In some embodiments, the frictionless planetary carrier comprises a central shaft including a pressurized air feed. In some embodiments, the frictionless planetary carrier comprises a plurality of planet sub-assemblies disposed radially outward from the central shaft, each of the plurality of planet sub-assemblies connected to the input side and to the output side by a bolt, wherein a first portion of the bolt is threaded and connected to a threaded carrier member disposed on the input side thereby forming a substantially airtight connection, and a second portion of the bolt is smooth and a connected to a carrier member on the output side thereby allowing air to pass between the carrier member and the bolt. In some embodiments, each of the planet sub-assemblies comprises a planet gear disposed to revolve around the bolt, and airbushing disposed between the bolt and an interior region of the planet gear. In some embodiments, the frictionless planetary carrier comprises an air channel disposed in the output member connecting the pressurized airfeed with each of planet sub-assemblies, such that pressurized air in contact with the airbushing creates a frictionless surface between the planet gear and airbushing.

In some embodiments, the frictionless planetary carrier further comprises a motor having an external rotor and motor coils, wherein the motor coils are affixed to the exterior of the central shaft. In some embodiments, the pressurized air feed feeds into the motor coils, such that the pressurized air feed cools the motor coils.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIG. 18 is an illustration showing a robotic arm in folded and extended positions, according to some embodiments of the present disclosure.

FIG. 19 shows tables with actuator parameters, according to some embodiments of the present disclosure.

FIG. 23 is a table listing system specifications, according to some embodiments of the present disclosure.

DESCRIPTION

Figure 1:
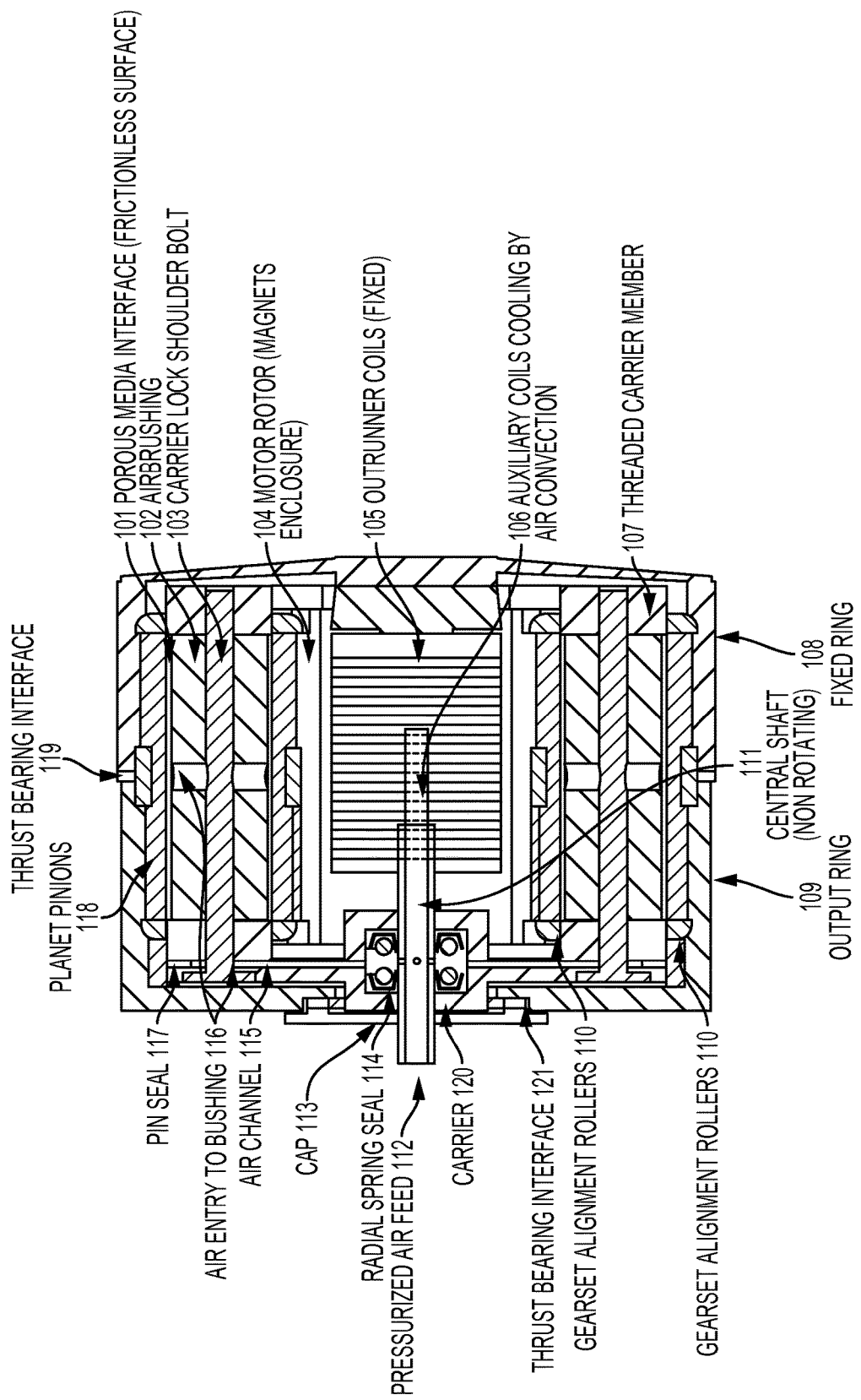
FIG. 1 is a diagram showing a GBD with a carrier system and air bearings, as described in some embodiments of the present disclosure.

Space robotics requires a new generation of actuators that have high power densities and high efficiencies, high positioning resolutions, high torque capacities and torsional stiffnesses. Ideally they should be lightweight and low-cost.

To reduce the size, cost, and manufacturing complexity of robotic actuators and other gearboxes, there is a need for an approach that both reduces the overall complexity of a gear assembly and provides for greater stability. In some aspects, the systems and methods described herein provide a frictionless planetary carrier using pressurized air. In some aspects the systems and methods described herein provide a motor gearbox with a pseudo-ground to balance skew moments. In some aspects, the systems and methods described herein provide for a joint structure that are multiplexed using dual-function mechanical components, such that the actuator can be optimized for its torque density and compact size. With its small size and weight and its large torque output, the actuator described herein can benefit numerous applications, ranging from space manipulators to actuated prosthetics and medical devices.

In some aspects, the systems and methods described herein can be implemented in a Gear Bearing Drive (GBD), as described in U.S. Pat. No. 8,016,893, entitled "Gear Bearing Drive," the contents of which are incorporated by reference.

Frictionless Planetary Carrier

In some embodiments, a frictionless planetary carrier can be used with a variety of gearboxes. The frictionless planetary carrier can also be used with the GBD, to form an "Air GBD." The Air GBD is based on a GBD actuator that uses a two stage high reduction planetary gearbox, roller surfaces to maintain gearset alignment, and a drive motor integrated within the first stage planetary structure to reduce the size of the assembly. The Air GBD includes additional features that use pressurized air to maximize the actuator efficiency and perform auxiliary temperature cooling and break/lock functions in the actuator structure.

The Air GBD utilizes a floating carrier combined with airbushings to keep the planets parallel throughout the mesh cycle. Airbushing utilizes porous media that develops a friction boundary layer on which the planets pinions exhibit frictionless rotation. The pressurized air is fed into the airbushings via the air channels of the carrier. The carrier floats on the central shaft using radial seals that enables air diffusion into the air channels while allowing relative carrier rotation with respect to the central shaft.

The systems and methods described herein can offer valuable direct and indirect benefits to the actuator performance, such as:
1) The frictionless airbushings enable extreme efficiency values beyond the capabilities of traditional actuators that use standard ball bearings for constraining the planets.
2) The planetary carrier diffuses the air pressure into all planets via a central air fed shaft. The carrier floats and revolves on the central shaft using a radial spring seal.
3) The central shaft diffuses auxiliary air pressure to the motor coils and gear components for temperature cooling. This can be used to increase the duty cycle and power handling of the actuator by forced heat convection.
4) The air pressure gradient can be used to actuate an on-demand break mechanism to lock/break the actuator as opposed to using the motor torque for breaking.
5) The frictionless mechanism can further eliminate the stiction effects which therefore increase the overall resolution and accuracy of the actuator.
6) The carrier can be used to keep the planets parallel throughout their mesh cycle, while angular rollers can be used to maintain gearset alignment and to absorb the inertial forces.

FIG. 1 is a diagram showing a GBD with a carrier system and air bearings, as described in some embodiments of the present disclosure. FIG. 1 shows porous media interface 101, airbushing 102, carrier lock shoulder bolt 103, motor rotor 104, outrunner coils 105, auxiliary coils 106, threaded carrier member 107, fixed ring, output ring 109, gearset alignment rollers 110, central shaft 111, pressurized air feed 112, cap 113, radial spring seal 114, air channel 115, air entry to bushing 116, pin seal 117, planet pinions 118, thrust bearing interface 119, output side carrier 120, and thrust bearing interface 121.

FIG. 1 illustrates one carrier on the input side 107 and one carrier on the output side 120. The carrier on the input side is threaded 107. The input and output carriers 107 120 are connected by a shoulder bolt 103 at each planet pinion 118 (also referred to herein as a planet gear). A shoulder bolt 103 comprises a threaded surface at one end and a smooth surface at the other end. The threaded end of the shoulder bolt 103 attaches to the input carrier, which is also threaded 107. The contact formed by the threaded end of the shoulder bolt 103 and the threaded carrier member 107 creates a substantially airtight seal. The end of the shoulder bolt 103 with a smooth surface attaches to the output carrier 120. Because the shoulder bolt 103 is smooth on the output side, air can pass between the carrier 120 and bolt 103 contact (e.g., 116).

Between each planet pinion 118 is an airbushing 102. The airbushing has a porous media interface 101 that acts as a frictionless surface when the airbushing 102 is pressurized. The airbushing 102 comprises a porous material that allows the diffusion of air into the bushing/planet interface. Pressurized air 112 is fed into the system through a central shaft 111 on the output side. In some embodiments, the central shaft 111 is non-rotating. The pressurized air passes through a radial spring seal 114 and through an air channel 115 which feeds into one or more airbushings 102 through a portion where the smooth portion of the bolt 103 and the output carrier 120 make contact. Pressure is maintained in part by at least one pin seal 117 which keeps air from escaping from one end of the air channel 115. The radial spring seals 114 keep air from flowing out of the carrier 120 and allow the carrier 120 to rotate around the central shaft 111.

The pressurized air feed 112 also sends air to the auxiliary coils 106. The auxiliary coils 106 can cool the outrunner coils 105 and motor rotor 104 by air convection.

A thrust bearing interface 119 is placed in between the fixed ring 108 and the output ring 109. A thrust bearing interface 121 is also placed between a cap 113, which is threaded onto the central shaft 111, and the output ring 109.

Balanced Gearbox

Embodiments described in the present disclosure include techniques for stabilizing a gearbox. In particular, these techniques can be applied to a GBD. In some embodiments, a pseudo-ground stage is added to a GBD gearbox to balance the skew moments on the planets subassembly resulting from large output load moments. This actuator is referred to herein as GBD2, wherein GB2 also refers to any gearbox implementing the stabilization techniques described herein. In some embodiments, the actuator comprises a two-stage differential planetary gearbox with a built-in frameless motor embedded within the sun gear. In some embodiments, the pseudo ground stage is positioned such that the face width and offset distance are optimized to counter the total skew moments on the planets in the gearbox.

In some embodiments, GBD2 is constructed using two bearing components from any combinations e.g. angular-angular, taper-taper, taper-thrust, angular-thrust such that the output gear is fully constrained by the two bearings in the radial and thrust direction. A locknut can be mounted on the central shaft is used to restrain the pseudo-ground ring between the two bearings.

In some embodiments, GBD 2 enables to use generic rollers to locate the planets in their orbit such the motor rotor floats on the parallel roller surfaces to maintain its air gap. In some embodiments, the stator-to-rotor air gap is maintained by the same roller features that radially locate and align the remaining planetary cluster. In some embodiments, the rotor encoder is housed inside the assembly on the ground ring. In some embodiments, GBD 2 enables actuating both ground planets and output stage planets to achieve more freedom in selecting the gear ratio.

In some embodiments, GB2 is assembled using dual-functions components with common features to simplify the assembly and reduce the number of parts. In some embodiments, the features comprise of cylindrical roller surfaces adjacent to the gear components. These surfaces can locate the planetary cluster radially, eliminating the need for conventional planetary carriers and corresponding bearings. In some embodiments, the roller surfaces have a rolling diameter equal to the adjacent gear pitch diameter to synchronize the gear fraction and rolling motion. The planetary cluster can be axially retained through an abutment between the edges of the roller surfaces and gear teeth crowns.

In some embodiments, the output stage is placed between two symmetric ground stages to balance the yaw moment developing between the ground and output stages. This approach allows retaining the parallelism and perpendicularity of the planets, and provides bearing support to the actuator output. Additionally, the two-stage differential gearbox enables speed reductions up to 1:2000. In some embodiments, the ratio is inversely proportional to the difference in the planets pitch diameters. This allows for the attainment of very large speed reductions independent of the size of the mechanism.

Figure 2:
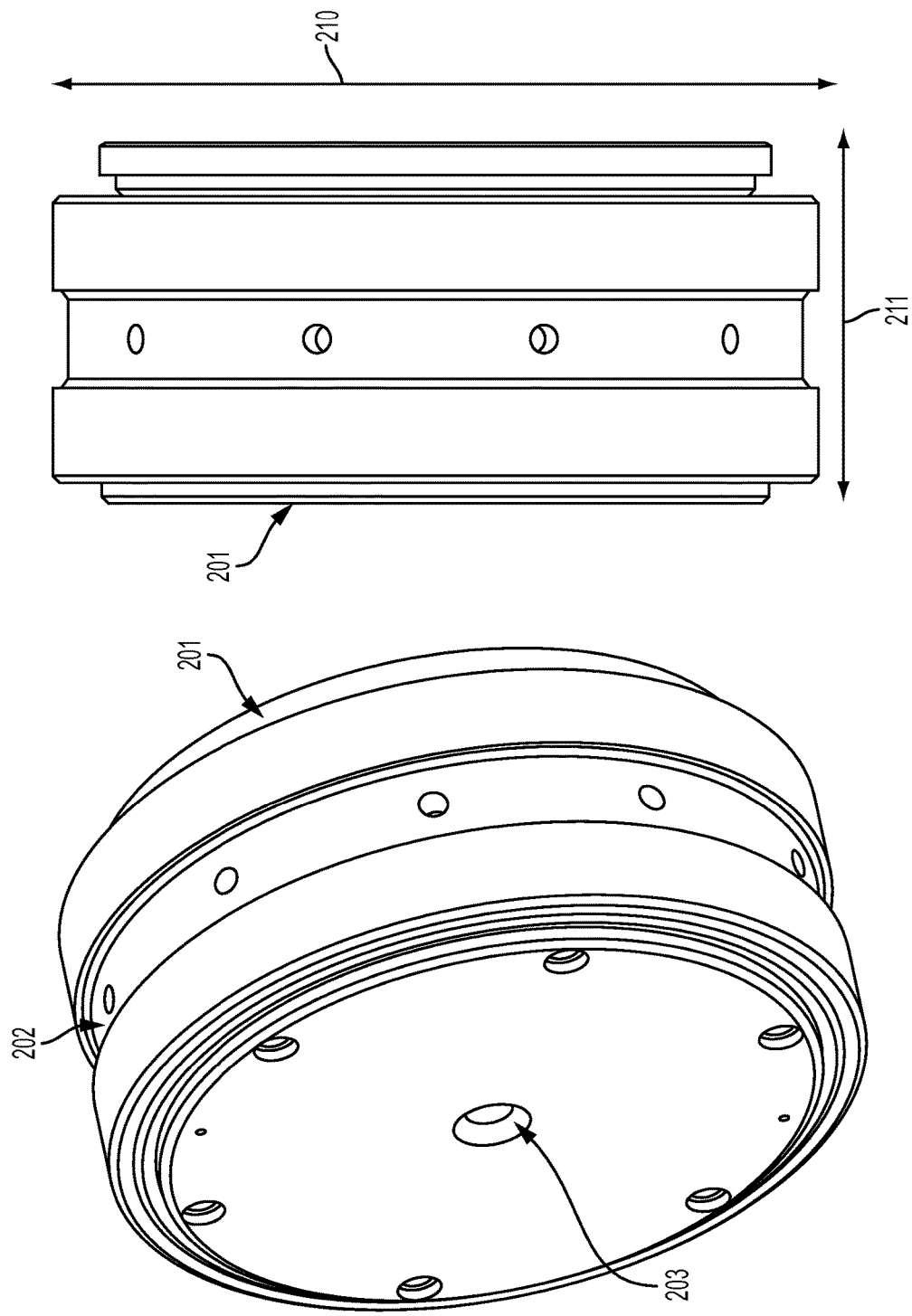
FIG. 2A and FIG. 2B show the exterior of a gearbox with a pseudo-ground, as described in some embodiments of the present disclosure.

FIGS. 2A-B shows the exterior of a gearbox with a pseudo-ground, as described in some embodiments of the present disclosure. FIGS. 2A-B collectively show actuator mountings 201, outer member/adapter 202, hole for electronics wire 203, and actuator dimensions 210 211.

In some embodiments, the actuator is cylindrical in shape. Preferably, the actuator is approximately 1 to 3 inches in height 211 (e.g., 2.25 inches) and has a diameter 210 of approximately 2.5 to 6 inches (e.g., 4.8 inches). The actuator includes a mount 201 on a first face of the cylinder. The mount 201 can be on either side of the actuator or on both sides simultaneously. The mount 201 allows the actuator to be connected to other devices (e.g., other actuators, as shown in more detail in FIG. 18). On a second face of the cylinder, is a thru hole or exit 203 for drive electronics wires. As described in more detail below, the motor is located within the actuator and in some embodiments, requires a thru hole 203 for wires that power the motor. The actuator also includes an output member/adapter 202. The output member/adapter 202 can receive power from the actuator and transfer it to an output source. In some embodiments, the output member/adapter 202 can transfer power in two directions (e.g., inline via the output member and parallel via a timing belt pulley).

Figure 3:
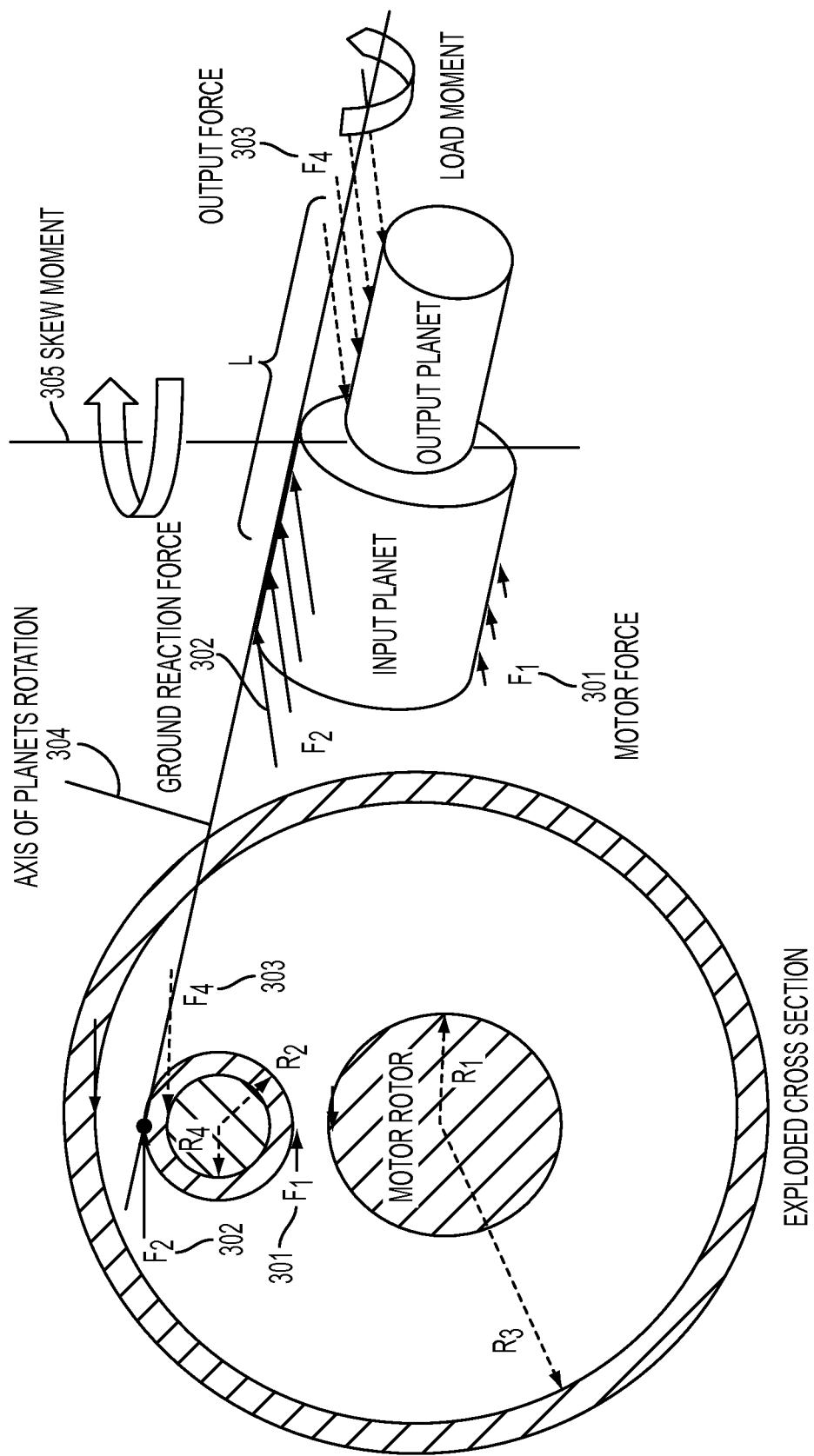
FIG. 3 is a diagram showing the forces on a Gear Bearing Drive, as described in some embodiments of the present disclosure.

FIG. 3 is a diagram showing the forces on a Gear Bearing Drive, as described in some embodiments of the present disclosure. FIG. 3 shows motor force F1 301, ground reaction force F2 302, output force F4, 303, axis of planets rotation 304, and skew moment 305.

The gearbox described herein can be used in a variety of applications, and the problems addressed by the gearbox shown and described in FIG. 3 are exemplary only. In a GBD, a motor rotor spinning in a first direction produces a corresponding motor force F1 301 in a direction opposite the direction of the rotor spinning A gear connected to the motor rotor makes contact with an input planet, causing the input planet to spin and to produce a ground reaction force F2 302 in the same direction as the motor force F1 301. The input planet gears are in contact with output planet gears, which cause the output planet to spin in the opposite direction of the input planet and produce an output force F4 303 corresponding to the output planet. The opposing ground reaction force F2 302 and the output force F4 303 can cause a skew moment 305, or the amount of yaw moment developing between the ground and output stages due to the forces 302 303. Embodiments of the gearbox described herein address the skew moment between two opposing gear forces.

Figure 4A:
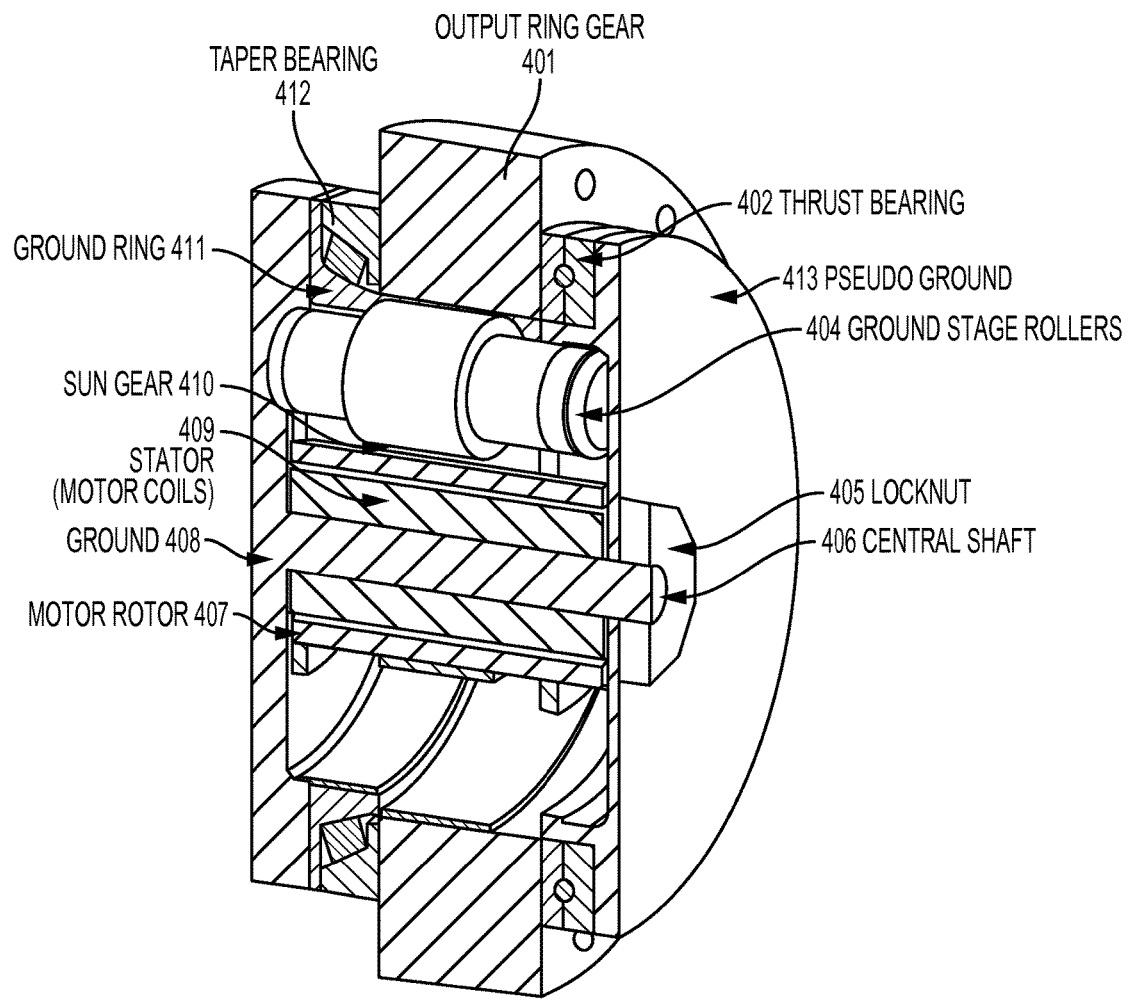
FIG. 4A and FIG. 4B show an internal architecture of a gearbox with a pseudo ground, as described in some embodiments of the present disclosure.
Figure 4B:
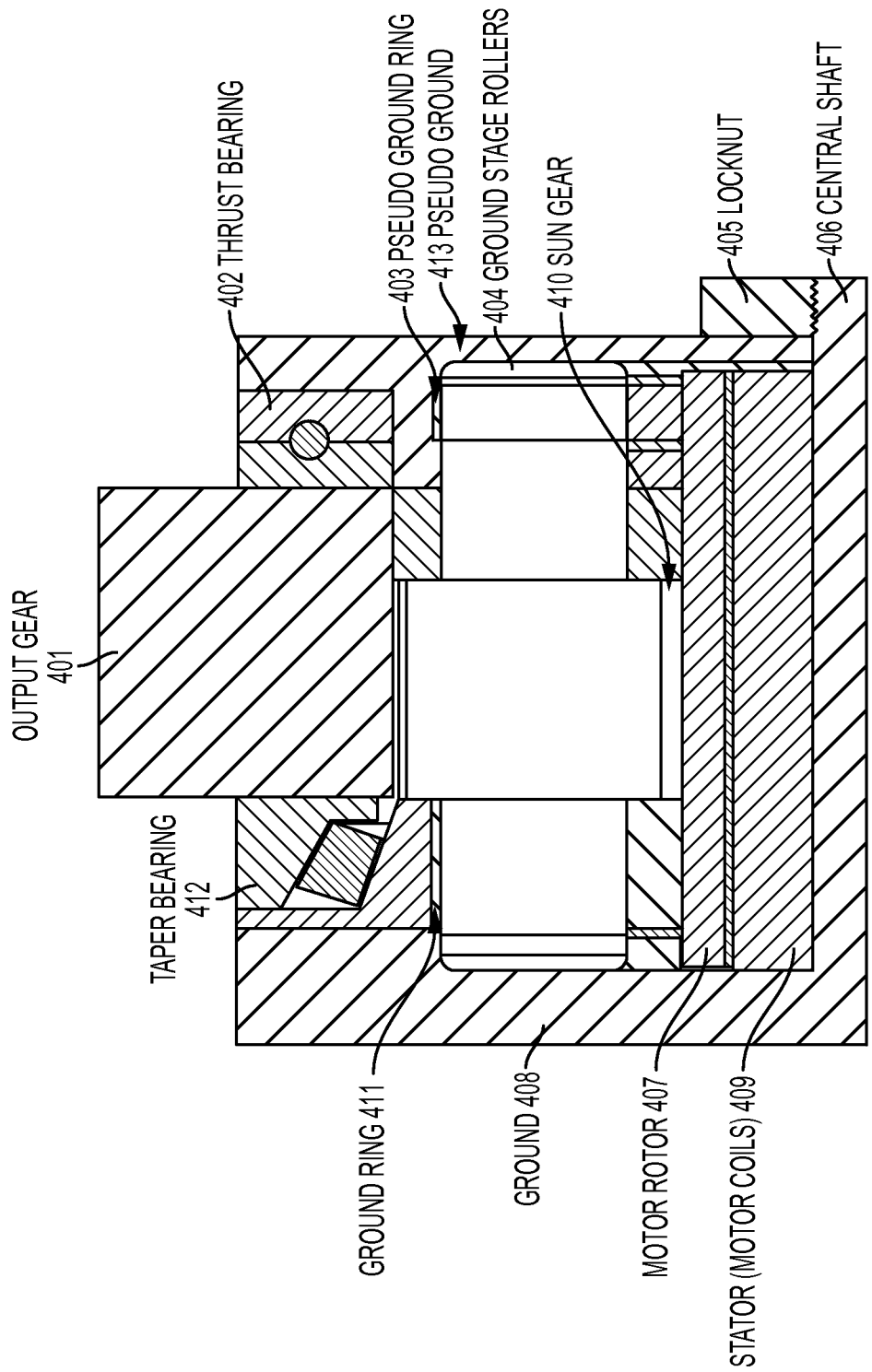

FIG. 4A and FIG. 4B show an internal architecture of a gearbox with a pseudo ground, as described in some embodiments of the present disclosure. Taken together, FIGS. 4A and 4B show an output ring gear 401, thrust bearing 402, pseudo ground ring 403, ground stage rollers 404, locknut 405, central shaft 406, motor rotor 407, ground 408, stator (motor coils) 409, sun gear 410, ground ring 411, taper bearing 412, and pseudo ground.

Ground 408 and pseudo ground 413 are connected by a central shaft 406. Locknut 405, a nut that resists loosening under vibrations and torque, secures pseudo ground 413 to central shaft 406. In some embodiments, locknut 405 is mounted on central shaft 406 and used to restrain pseudo-ground ring 403 between thrust bearings 402 or taper bearings 412. In some embodiments, ground 408 and pseudo ground 413 are connected using a radially tensioned friction-bonded joint. A shear friction torque is developed between the exterior surface of the pseudo-ground shaft and interior surface of the ground plate, rigidly coupling the two grounds. In some embodiments, central shaft 406 is made of a material of high strength and stiffness (e.g., steel). In some embodiments, ground ring 411 comprises a material with high thermal conductivity to dissipate heat from the motor coils 409. In some embodiments, pseudo-ground 413 comprises a material with high strength and stiffness to counter the high torque developed in the central shaft connecting the two grounds together.

In some embodiments, ground and pseudo ground are attached by an external clamp. In some embodiments, the clamp is external to the actuator and can be U-shaped. The clamp serves a similar purpose as central shaft 406 in that it keeps the ground and pseudo ground fixedly attached to one another. In some embodiments, it can be advantageous to use a clamp rather than a central shaft to allow space for a large motor. When using a clamp, the stator can be fixedly attached to ground. As in the embodiments with a central shaft, an air gap is maintained between a stator and a motor rotor by the abutment of rollers within the actuator.

Output gear 401 moves in response to an output planet gear (not shown), which in turn moves in response to input planet gears (not shown) and sun gear 410. In some embodiments, sun gear 410 includes two parallel sets of teeth extending radially outwardly and disposed circumferentially around the sun gear. Each of the sets of a plurality of teeth in the sun gear 410 can mesh with an input planet gear (also referred to herein as ground planet gear). In some embodiments, a collection of input planet gears is referred to as first stage planets. In some embodiments, an output planet gear is sandwiched in between the two input planet gears. In some embodiments, an output planet gear is coupled with only one input gear. In some embodiments, the combination of input planet gear(s) and an output planet gear form a planet sub-assembly. In some embodiments, there are two input planet gears in a planet sub-assembly. In some embodiments, some planet sub-assemblies have only one input planet gear. In some embodiments, input planets are chosen and arranged such that a combination of the at least one input planet gears from each of the plurality of planet sub-assemblies provides a structural symmetry to balance loads of the planetary gearbox. For example, in some embodiments, each planet sub-assembly has two input planet gears of the same size. There can be multiple planet sub-assemblies in the gearbox. In some embodiments, a plurality of planet sub-assemblies are disposed to interface with and revolve around the sun gear sub-assembly and disposed to interface with and revolve within the ground ring and the pseudo ground ring. In each planet sub-assembly, the output planet gear meshes with an output ring 401. Output ring 401 is constrained by taper bearing 412 and thrust bearing 402. In some embodiments, two bearing components from any combinations e.g. angular-angular, taper-taper, taper-thrust, angular-thrust are used such that the output gear is fully constrained by the two bearings in the radial and thrust direction. Output ring 401 drives the output 510.

Pseudo ground ring 403 and ground ring 411 are stationary and allow ground stage rollers 404 to roll around the ring. In some embodiments, ground ring 411 is constrained by a first ground sleeve and pseudo ground 413 is constrained by a second ground sleeve. In some embodiments, the first ground sleeve is attached to ground 408 and the second ground sleeve is attached to pseudo ground 413, as described in more detail below. In some embodiments, the ground ring is integrated into the ground such that ground ring and ground are one unit.

In some embodiments, the gearbox described herein can include a sensing system for feedback control. The sensing system can include a grating disk (e.g., a magnetic disk, optical disk) attached to the sun gear. A sensor (e.g., a Hall effect sensor) can be attached to ground and configured to locate a position of the sun gear relative to the first ground by sensing a position signature of the grating disk.

Figure 5:
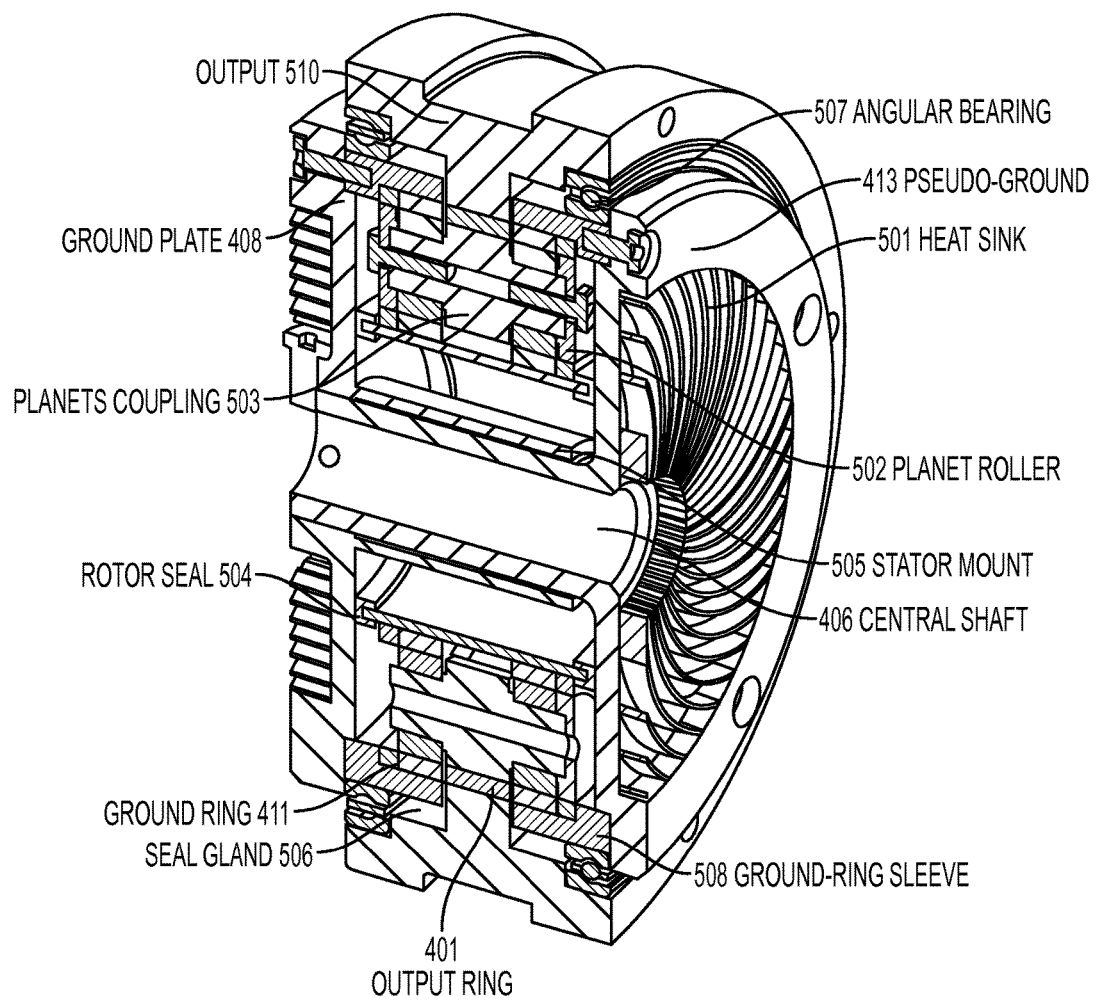
FIG. 5 is an illustration showing a metal prototype of a gearbox with a pseudo ground stage, as describe in some embodiments of the present disclosure.

FIG. 5 is an illustration showing a metal prototype of a gearbox with a pseudo ground stage, as describe in some embodiments of the present disclosure. FIG. 5 shows output ring 401, central shaft 406, pseudo ground 413, ground plate 408, ground ring 411, heat sink 501, planet roller 502, planets coupling 503, rotor seal 504, stator mount 505, seal gland 506, angular bearing 507, ground ring sleeve 508, and output 510.

Figure 10:
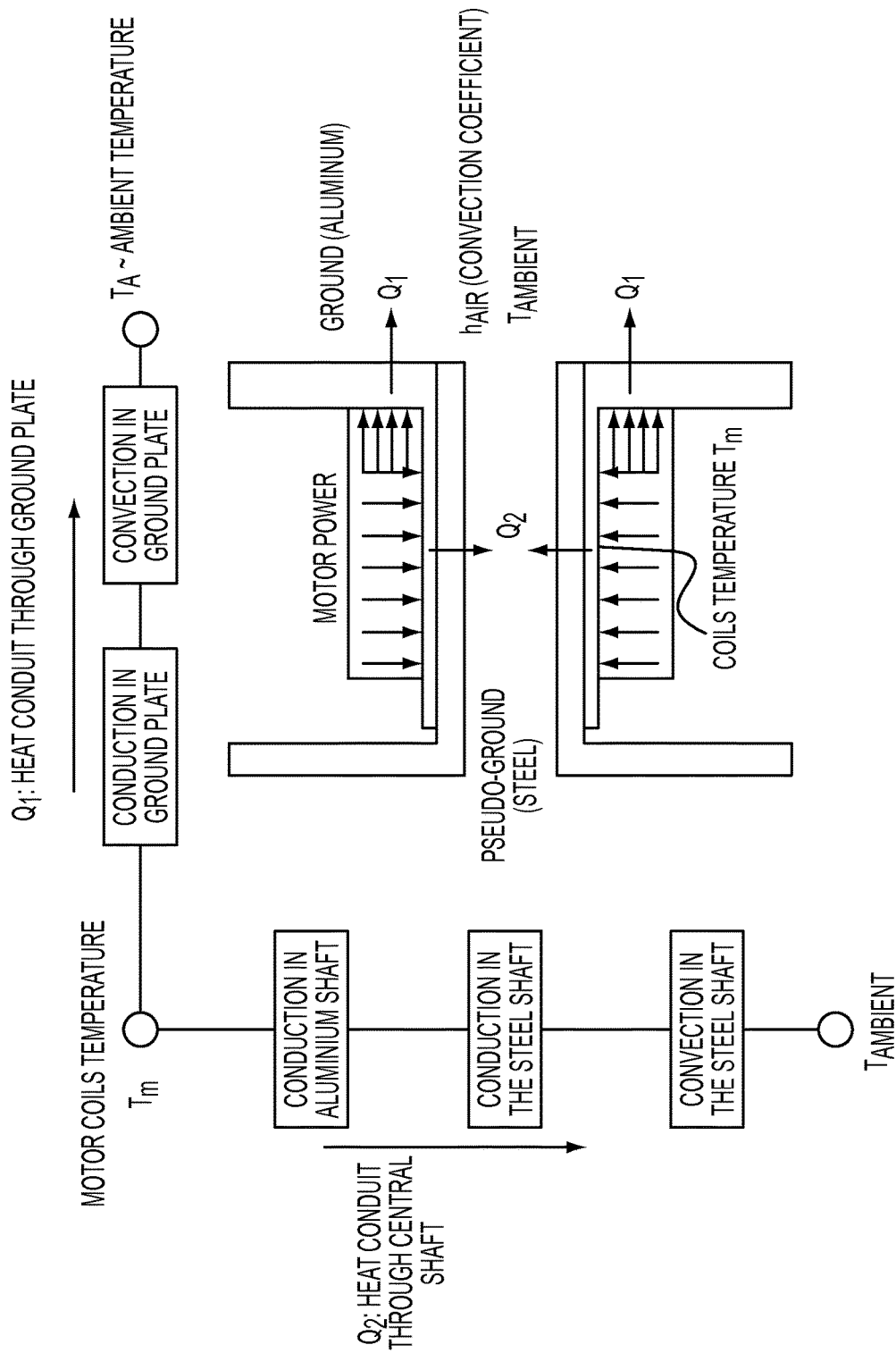
FIG. 10 is a diagram showing a thermal circuit that can be used to calculate the thermal resistance needed to dissipate motor heat from coils, according to some embodiments of the present disclosure.

Heat sink 501 is mounted at pseudo ground 413 and ground to dissipate heat. In some embodiments, the specifications of the heat sink correlate are selected to ensure the motor coils remain below a specified temperature of during continuous operation (e.g., a manufacturer specified temperature of 120 C). In some embodiments, the heat generated in the coil is due to the static power losses in the stator resistance. For example, during continuous operation, suppose a brushless motor outputs 0.35 Nm at 2500 RPM and is 80% efficient. The total watt losses due to motor deficiencies are equivalent to 26 Watts, which must be dissipated to keep the motor coil temperature below 120 C. In some embodiments, a thermal circuit can be used to calculate the thermal resistance needed to dissipate the motor heat from coil temperature of 120 C to ambient temperature of 24 C, as shown in FIG. 10. From the thermal circuitry calculations, it can be estimated that approximately 50 in ^2 of additional surface area is needed to achieve the required thermal resistance for the example described above.

Planet roller 502 is a roller associated with a planet gear (not labeled). In some embodiments, planet roller 502 makes contact with a sun roller and a ground ring, as described in more detail below.

Planets coupling 503 couple together input stage planet gears and output stage planet gears. In some embodiments, planets coupling 503 can couple two input stage planets together with an output stage planet disposed in between the two input planet gears. In some embodiments, the planets are coupled together using dowel pins.

Rotor seal 504 forms a high-pressure seal between the stator and the rotor to prevent wear on the rotor. Stator mount 505 mounts the stator to the central shaft. Seal gland 506 can be used to prevent oil from leaking.

Angular bearing 507 has a similar function as taper bearing 412 or thrust bearing 402, as described in FIGS. 4A and 4B. Briefly, angular bearing 507 can be used to restrain pseudo ground ring 403 in conjunction with locknut 405 mounted on central shaft 406. Ground-ring sleeve 508 can be used to constrain the ground ring gears to the ground plates.

Output 510 is operably connected to output ring 401. As discussed above in FIG. 4, output ring 401 moves, in some embodiments, based on a combination of the movement of sun gear and at least one planet gear. The movement of the output ring 401 corresponds to a torque associated with output 510.

Figure 6A:
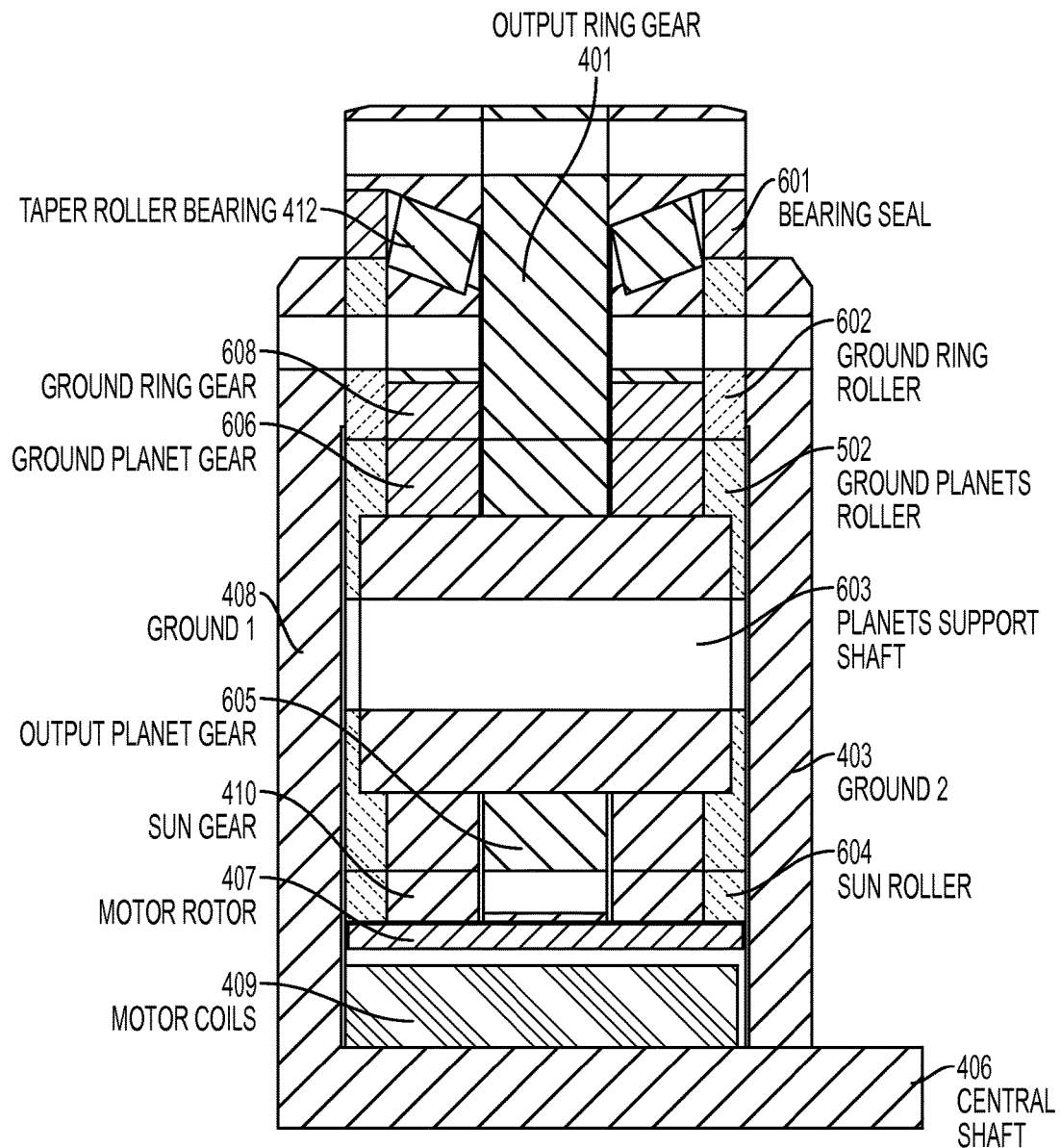
FIG. 6A and FIG. 6B are diagrams showing the internal architecture of a gearbox with a pseudo ground according to some embodiments of the present disclosure.
Figure 6B:
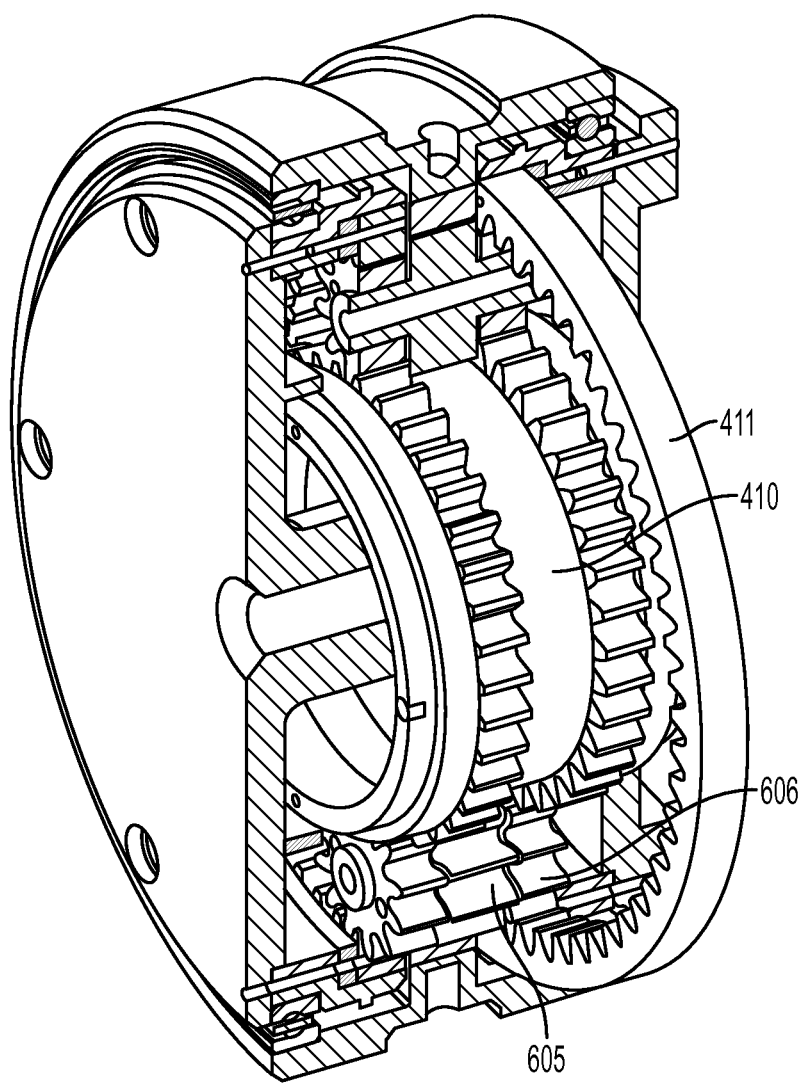

FIGS. 6A and 6B are diagrams showing the internal architecture of a gearbox with a pseudo ground according to some embodiments of the present disclosure. Taken together, they show output ring gear 401, ground 2 403, central shaft 406, motor rotor 407, motor coils 409, ground 1 408, taper roller bearing 412, ground planets roller 502, bearing seal 601, ground ring roller 602, planets support shaft 603, sun roller 604, output planet gear 605, ground planet gear 606, and ground ring gear 608.

Bearing seal 601 can be used to keep lubrication for the bearing within the bearing itself. Sun gear 410 is attached to sun roller 604. Sun gear 410 makes contact with a plurality of ground planet gears 606 and sun roller 604 makes contact with plurality of ground planets roller 502. Ground planet gear 606 is attached to ground planets roller 502. In some embodiments, sun gear 410 includes two parallel sets of teeth extending radially outwardly and disposed circumferentially around sun gear 410. As described above, sun gear 410 including parallel sets of teeth can drive a pair of planet gears 606 by meshing with teeth of the planet gears 606. Planet support shaft 603 connects output planet gear 605 with ground planet gears 606. As discussed above, the output planet gear 605 can be disposed in between the input planet gears 606. In some embodiments, planet support shaft 603 can be connected to planet gears 605 606 using dowel pins or adhesives. Ground ring roller 602 is attached to ground ring 608. Ground planet gear 606 has teeth that mesh with teeth associated with ground ring 608, and ground planet roller 502 makes contact with ground ring roller 602. Output ring gear 401 is activated when sun gear 410 causes ground planet gears 606 to rotate (also referred to herein as a first stage). Ground planet gears 606 then causes output planet gear 605 to rotate because of the coupling between the planets (also referred to herein as a second stage). The rotation of output planet gear 605 then activates output ring gear 401. As discussed above, in some embodiments, the use of rollers on both the ground and pseudo ground sides of the actuator in combination with the pseudo ground being physically connected with ground keeps the gears in place in the actuator. For example, in some embodiments, a series consisting of sun roller, ground planets roller, and ground ring roller are constrained by the abutment of the rollers with each other and by the ground ring, which is physically constrained by ground. In some embodiments, ground ring is embedded into ground such that the ground ring and ground are one piece (e.g., the ground is constructed with a ground ring).

Figure 7:
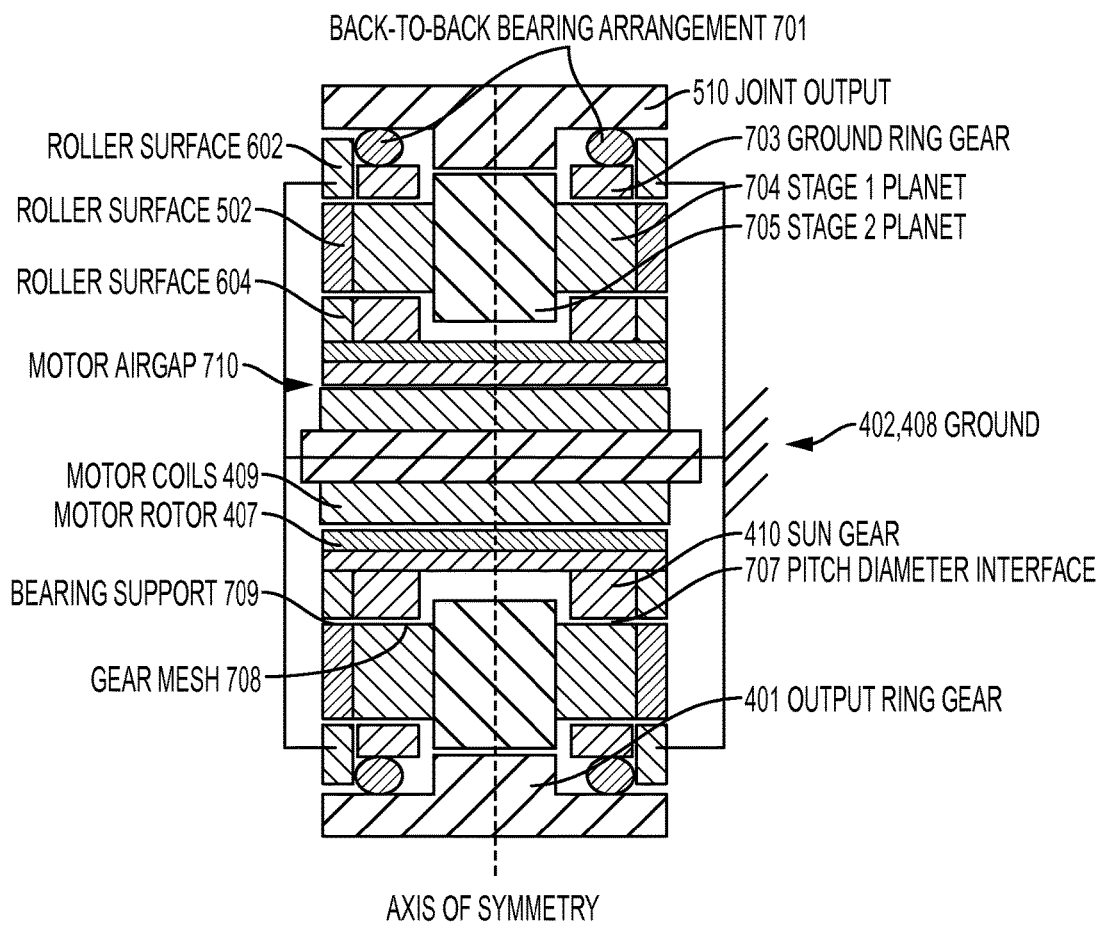
FIG. 7 is a diagram showing the internal architecture of a gearbox with a pseudo ground, according to some embodiments of the present disclosure.

FIG. 7 is a diagram showing the internal architecture of a gearbox with a pseudo ground, according to some embodiments of the present disclosure. FIG. 7 shows ground 408, sun gear 410, output ring gear 401, roller surfaces 502 602 604, joint output 510, back to back bearing arrangement 701, ground ring gear 703, stage 1 planet 704, stage 2 planet 705, pitch diameter interface 706, gear mesh 708, bearing support 709, and motor air gap 710.

Back to back bearing arrangement 701 can include a variety of bearing combinations, such as taper roller bearings, angular bearings, and thrust bearings as described above. Ground ring gear 703, as discussed above, is connected to a ground ring roller 602. Ground ring gear 703 is in contact with stage 1 planet 704. Stage 1 planet 702 is connected with stage 2 planet 705 by a planet coupling. In some embodiments, stage 1 planet 702 and stage 2 planet 705 are identical to ground planet gear 606 and output planet gear 605, as described in FIG. 6. Stage 2 planet 705 is in contact with output ring gear 401. As an example of how the gears are connected in this embodiment, when sun gear 410 is driven by a motor, sun gear 410, which has two sets of teeth, causes a parallel set of stage 1 planets to rotate in each planet sub-assembly. Stage 1 planets are coupled to stage 2 planet, hence causing stage 2 planet to rotate. When stage 2 planet rotates, the rotation causes output ring gear 401 to be activated. Gear mesh 708 and pitch diameter interface 706 characterize the contact between any two gears in this embodiment. Examples of gear meshes and pitch diameter interfaces are shown in FIGS. 12-13, and 15-17.

Motor air gap 710 is the gap between motor coils 409 and motor rotor 407. Typically, a motor air gap prevents motor coils against the rotor when the rotor turns. As described above, rotor 407 is embedded within sun gear 410, and stator 409 is inscribed within rotor 407. In some embodiments, motor gap 710 is maintained by the same roller surfaces that radially locate and align the remaining planetary cluster.

Figure 8:
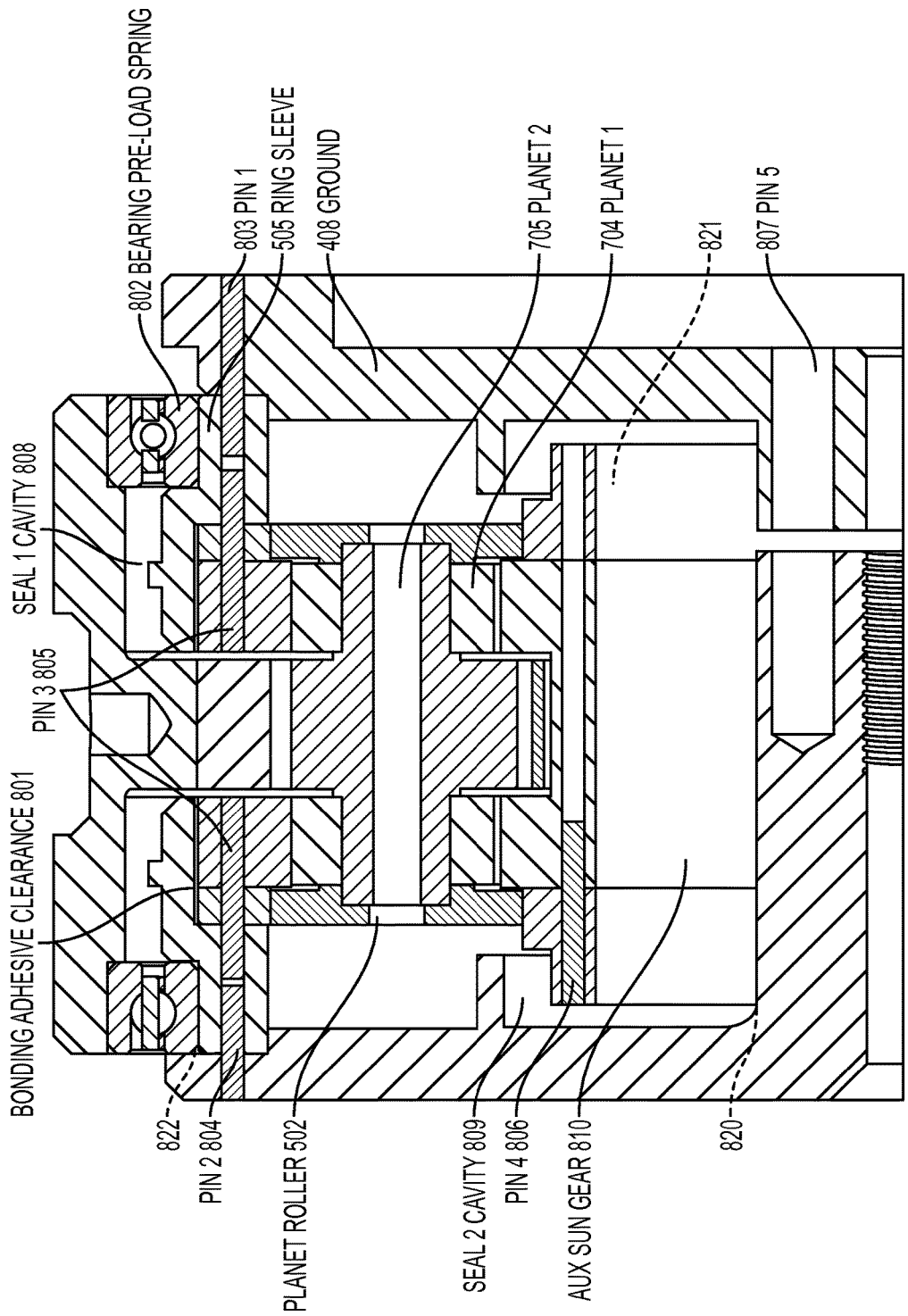
FIG. 8 is a diagram showing the internal architecture of a gearbox with a pseudo ground according to some embodiments of the present disclosure.

FIG. 8 is a diagram showing the internal architecture of a gearbox with a pseudo ground according to some embodiments of the present disclosure. FIG. 8 shows ground 408, ring sleeve 508, planet roller 502, planet 1 704, planet 705, bonding adhesive clearance 801, bearing pre-load spring 802, pin 1 803, pin 2 804, pin 3 805, pin 4 806, pin 5 807, seal 1 cavity 808, seal 2 cavity 809, auxiliary sun gear 810, minimum motor diameter 820, maximum motor diameter 820, and bearing inner diameter 822.

Bonding adhesive clearance 801 is a clearance needed to put the adhesives. Bearing pre-load spring 802 can be used to improve bearing performance and to reduce noise and vibration. In some embodiments, a pre-load spring is used instead of a solid preload because a pre-load spring is more resistant to temperature variations.

Pin 1 803 holds the alignment between the ring sleeve and ground stages. Pin 2 804 and Pin 3 805 serves the same function as Pin 1 803. Pin 4 806 holds the alignment between aux sun gear and main sun gear. Pin 5 807 holds the alignment between the two grounds together.

Seal 1 cavity 808 and seal 2 cavity 809 corresponds to a location to put a seal that contains the transmission lubrication.

Auxiliary sun gear 810 can refer to one set of a plurality of teeth associated with the sun gear. In some embodiments, sun gear 410 includes two auxiliary sun gears 810. As described above, each auxiliary sun gear 810 can mesh with a planet 1 gear 704. The two planet 1 gears 704 are disposed such that a planet 2 gear 705 sits in between the two planet 1 gears 704. When the auxiliary sun gears 810 is driven, the two planet 1 gears 704, which mesh with auxiliary sun gears 810, spin in unison in response. The rotation of the planet 1 gears causes the planet 2 gear to rotate, which in turn drives an output gear. In preferred embodiments, auxiliary sun gear 810 moves in unison with sun gear 410.

In some embodiments, a minimum motor diameter 820 is limited by a central shaft diameter. In some embodiments, the minimum motor diameter 820 is 0.9". In some embodiments, a maximum motor diameter 821 is limited by a maximum sun gear diameter. In some embodiments, the maximum motor diameter is 1.8". In some embodiments, bearing inner diameter 822 is 4".

Figure 9:
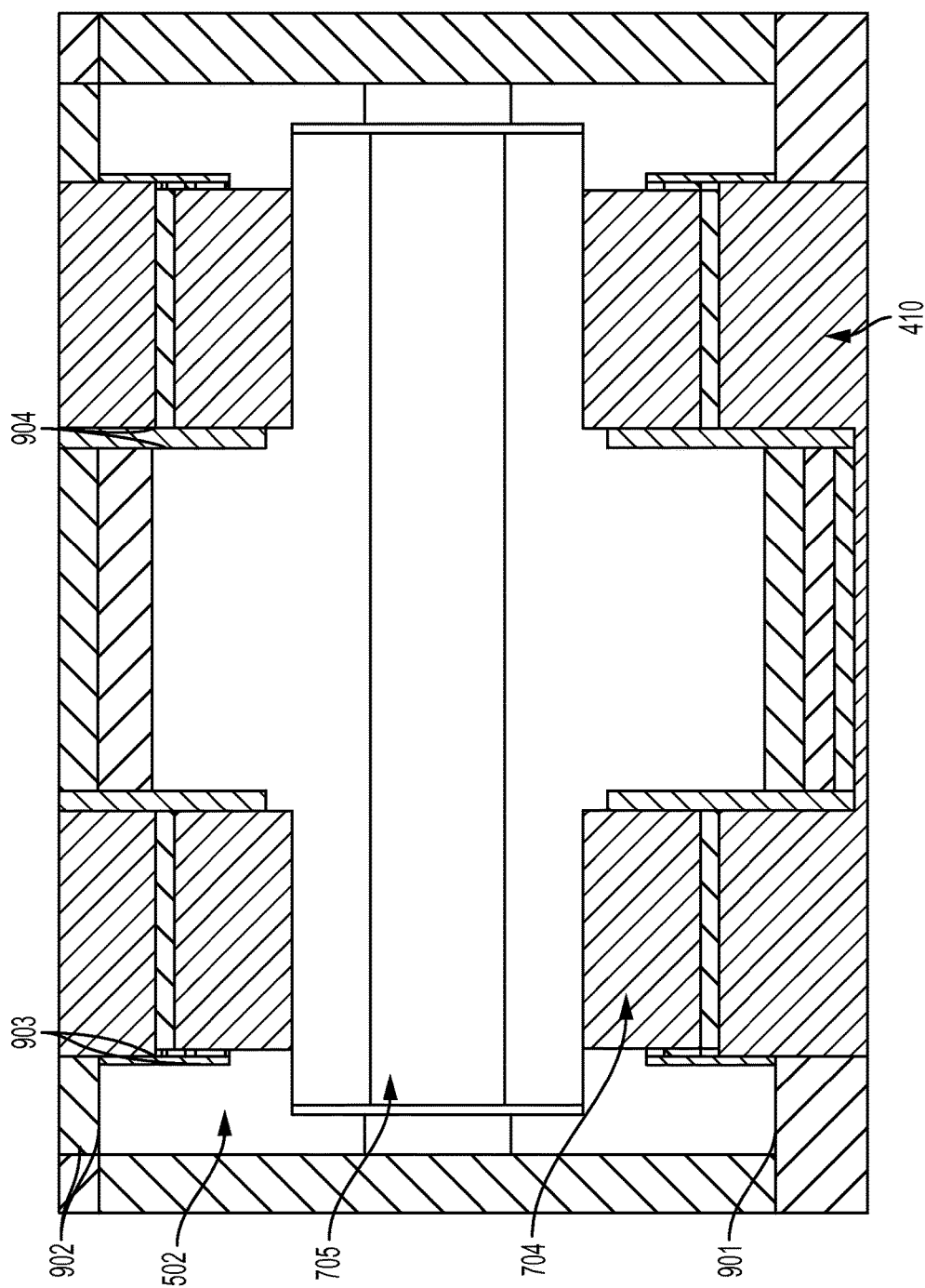
FIG. 9 is an expanded view showing gear and roller orientation in a gearbox with a pseudo ground, according to some embodiments of the present disclosure.

FIG. 9 is an expanded view showing gear and roller orientation in a gearbox with a pseudo ground, according to some embodiments of the present disclosure. FIG. 9 shows sun gear 410, stage 1 planet 704, stage 2 planet 705, planet roller 502, diametric roller tolerance 901, diametric clearance for rollers insertion 902, axial stack up clearance 903, and stage-to-stage clearance 904.

In some embodiments, diametric roller tolerance 901 is the tolerance needed to assembly the system. In some embodiments, diametric clearance for rollers insertion 902 is 0.007 inches. Diametric clearance 902 can refer to a radial clearance between the ring sleeve and ring roller internal diameters. In some embodiments, axial stack up clearance 903 is 0.016 inches. The stack up clearance 903 can refer to the total axial play in the planets subassemblies before the rollers hit either side of the ground ring gears. In some embodiments, stage-to-stage clearance 904 is 0.02 inches. Stage-to-stage clearance 904 can refer to the axial clearance between the different stages.

FIG. 10 is a diagram showing a thermal circuit that can be used to calculate the thermal resistance needed to dissipate motor heat from coils, according to some embodiments of the present disclosure.

Figure 11:
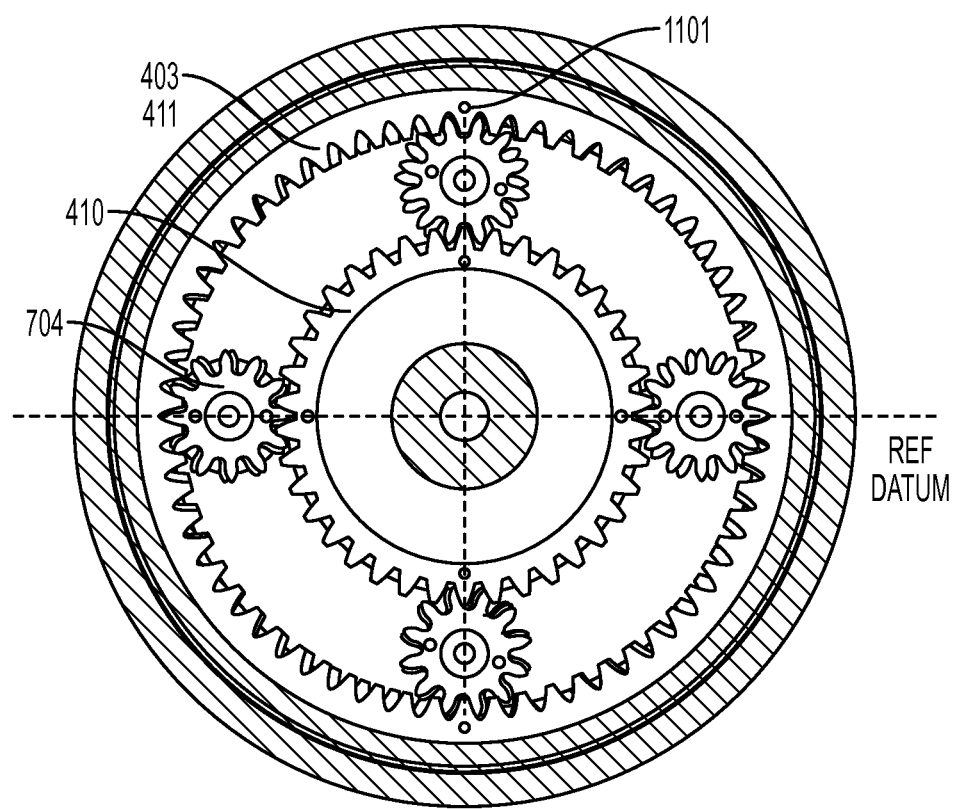
FIG. 11 is a diagram showing a first stage of a gearbox with a pseudo ground, according to some embodiments of the present disclosure.

FIG. 11 is a diagram showing a first stage of a gearbox with a pseudo ground, according to some embodiments of the present disclosure. FIG. 7 shows sun gear 410, stage 1 planet 704, ground ring 411/pseudo ground ring 403, and dowel pin 1101.

As discussed above, a first stage of a gearbox as described in some embodiments of the present disclosure can include sun gear 410 driving stage 1 planet 704. In certain embodiments, stage 1 is symmetrical. That is, sun gear 410 can drive a stage 1 planet 704 on both the ground and pseudo ground sides of the actuator. As described above, in some embodiments, sun gear 410 can drive two stage 1 planets with two sets of parallel teeth extending radially outwardly and disposed circumferentially around the sun gear.

Dowel pin 1101 size depends on the torques applied in the actuator. In some embodiments, the dowel pin is 1/16 of an inch.

Figure 12:
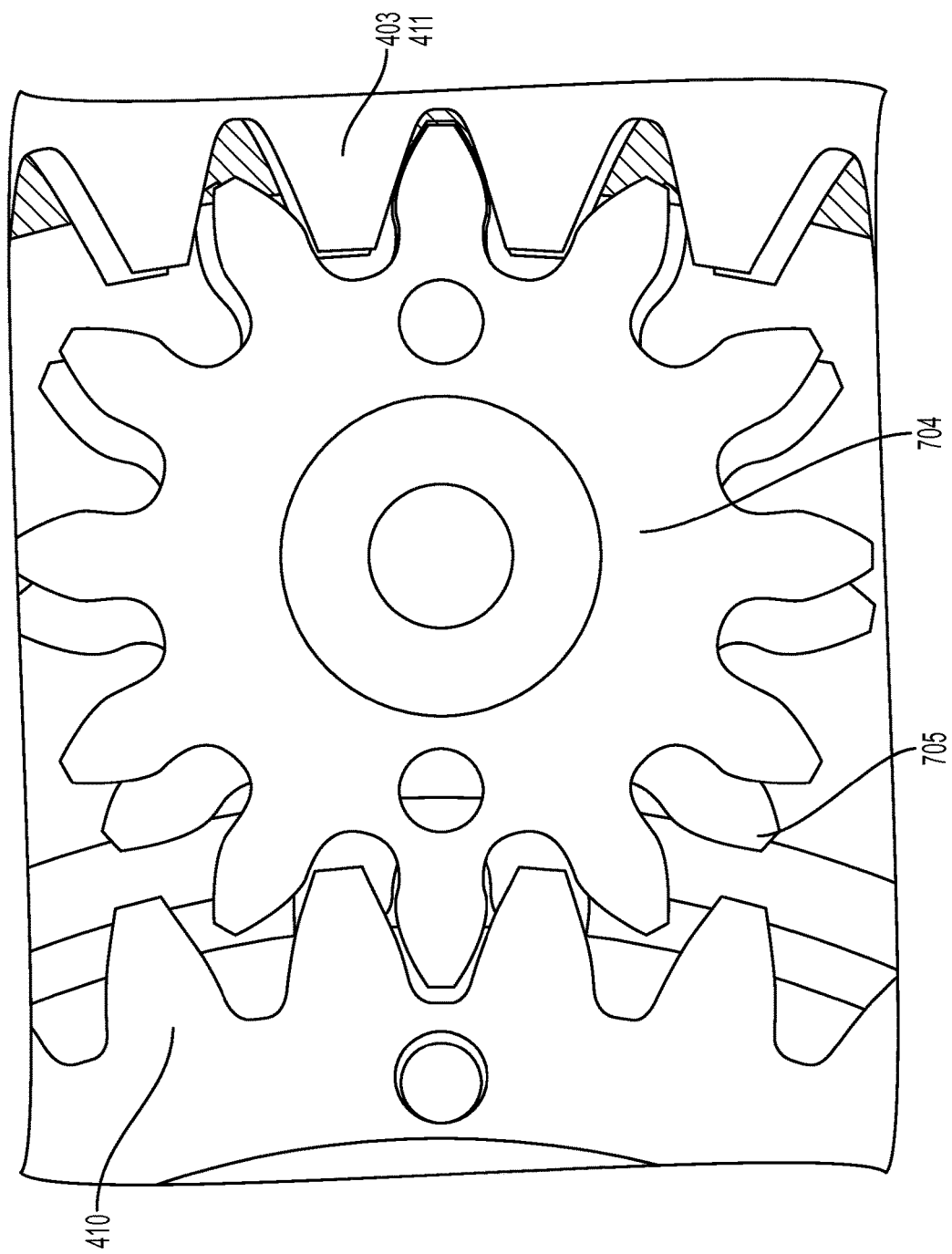
FIG. 12 is an expanded view showing a first stage of a gearbox with a pseudo ground, according to some embodiments of the present disclosure.
Figure 13:
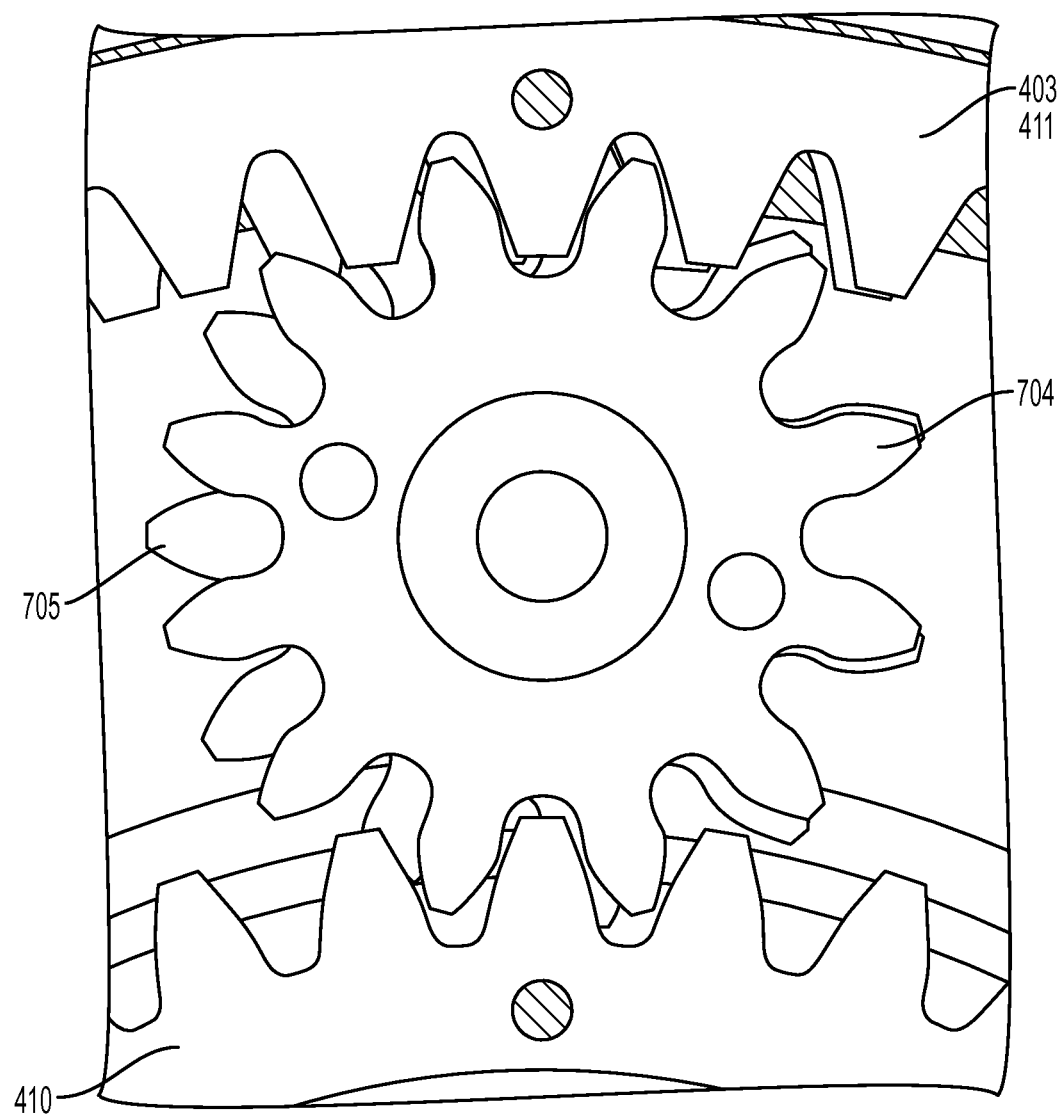
FIG. 13 is an expanded view showing a first stage of a gearbox with a pseudo ground, according to some embodiments of the present disclosure.

FIG. 12 and FIG. 13 are expanded views of the first stage diagram shown in FIG. 11.

Figure 14:
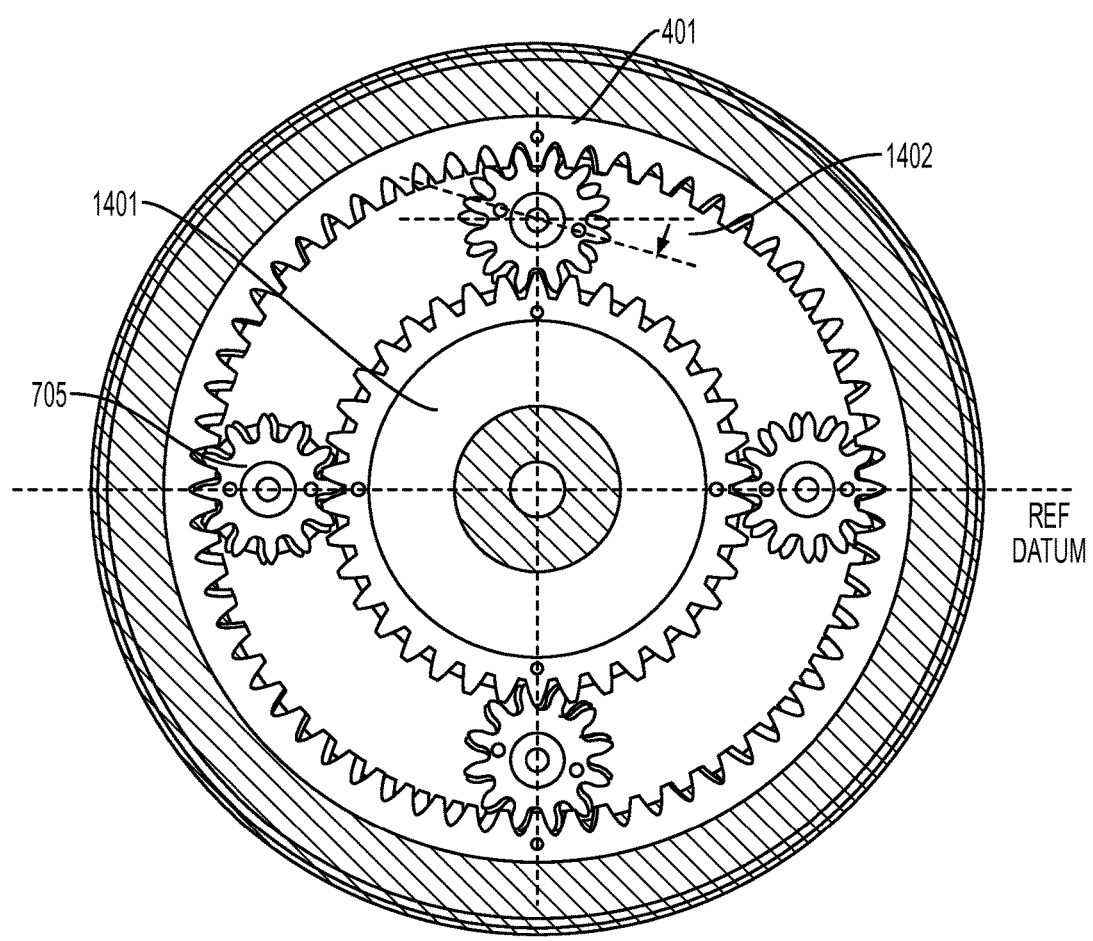
FIG. 14 is a diagram showing a second stage of a gearbox with a pseudo ground, according to some embodiments of the present disclosure.

FIG. 14 is a diagram showing a second stage of a gearbox with a pseudo ground, according to some embodiments of the present disclosure. FIG. 14 shows stage 2 planet 705, output ring gear 401, motor housing 1401, and differential timing angle 1402.

As discussed above, stage 2 planet 705 drives output ring gear 401. Differential timing angle 1402 is a phase angle between input/output planets. Unlike stage 1 planet 704, stage 2 planet teeth do not mesh with sun gear teeth.

Motor housing 1401 holds motor rotor 407 and motor coils/stator 409.

Figure 15:
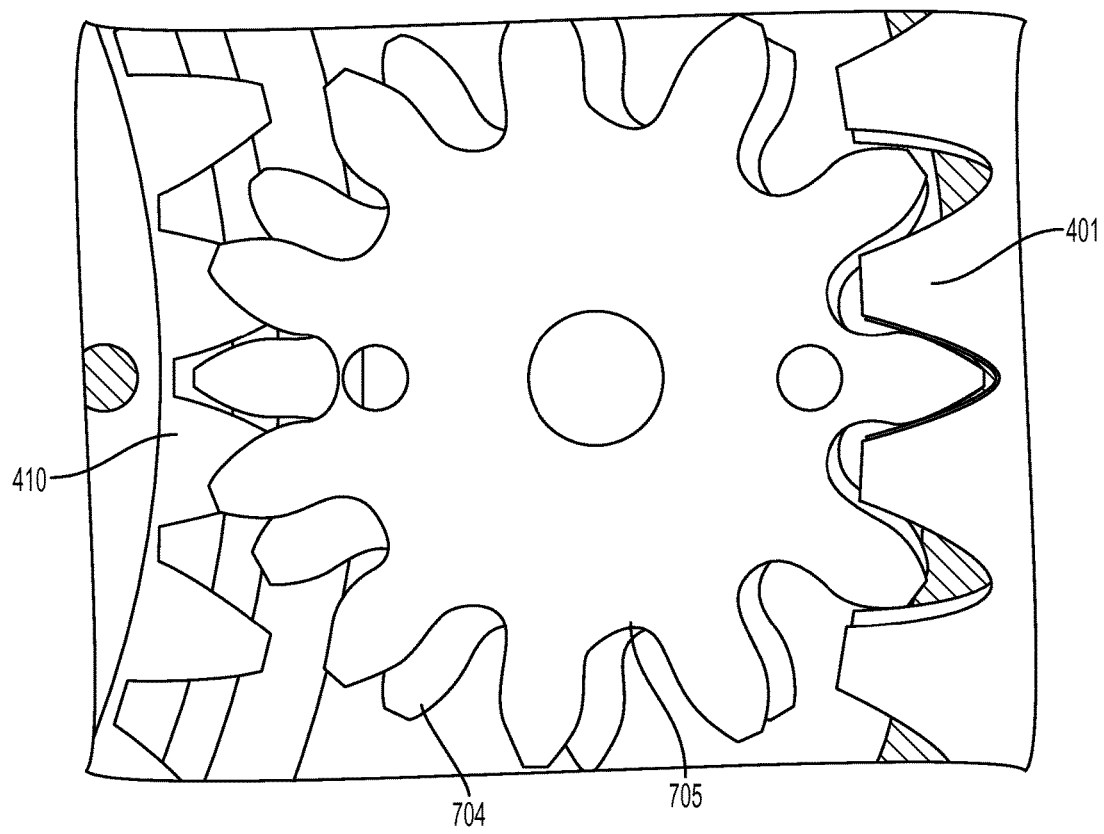
FIG. 15 is an expanded view showing a second stage of a gearbox with a pseudo ground, according to some embodiments of the present disclosure.
Figure 16:
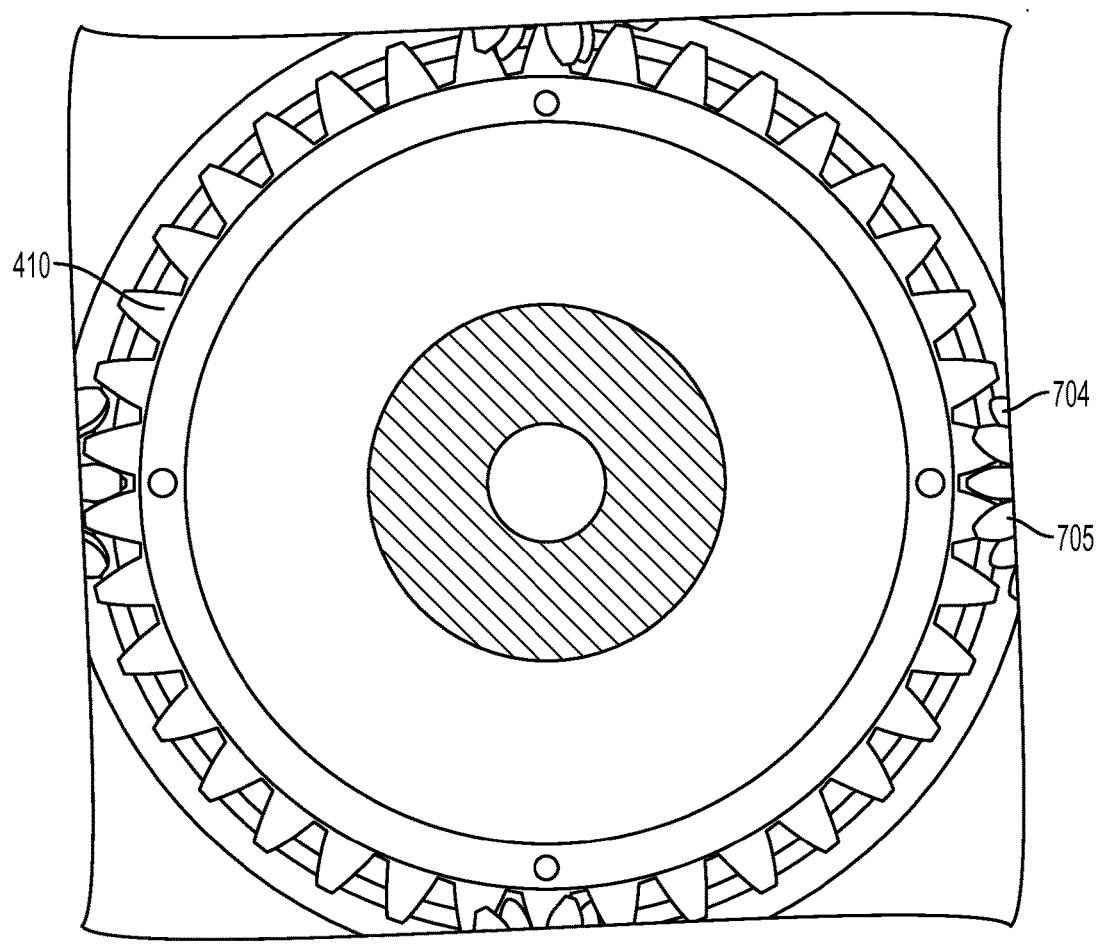
FIG. 16 is an expanded view showing a second stage of a gearbox with a pseudo ground, according to some embodiments of the present disclosure.

FIG. 15 and FIG. 16 are expanded views of the second stage diagram shown in FIG. 14.

Figure 17:
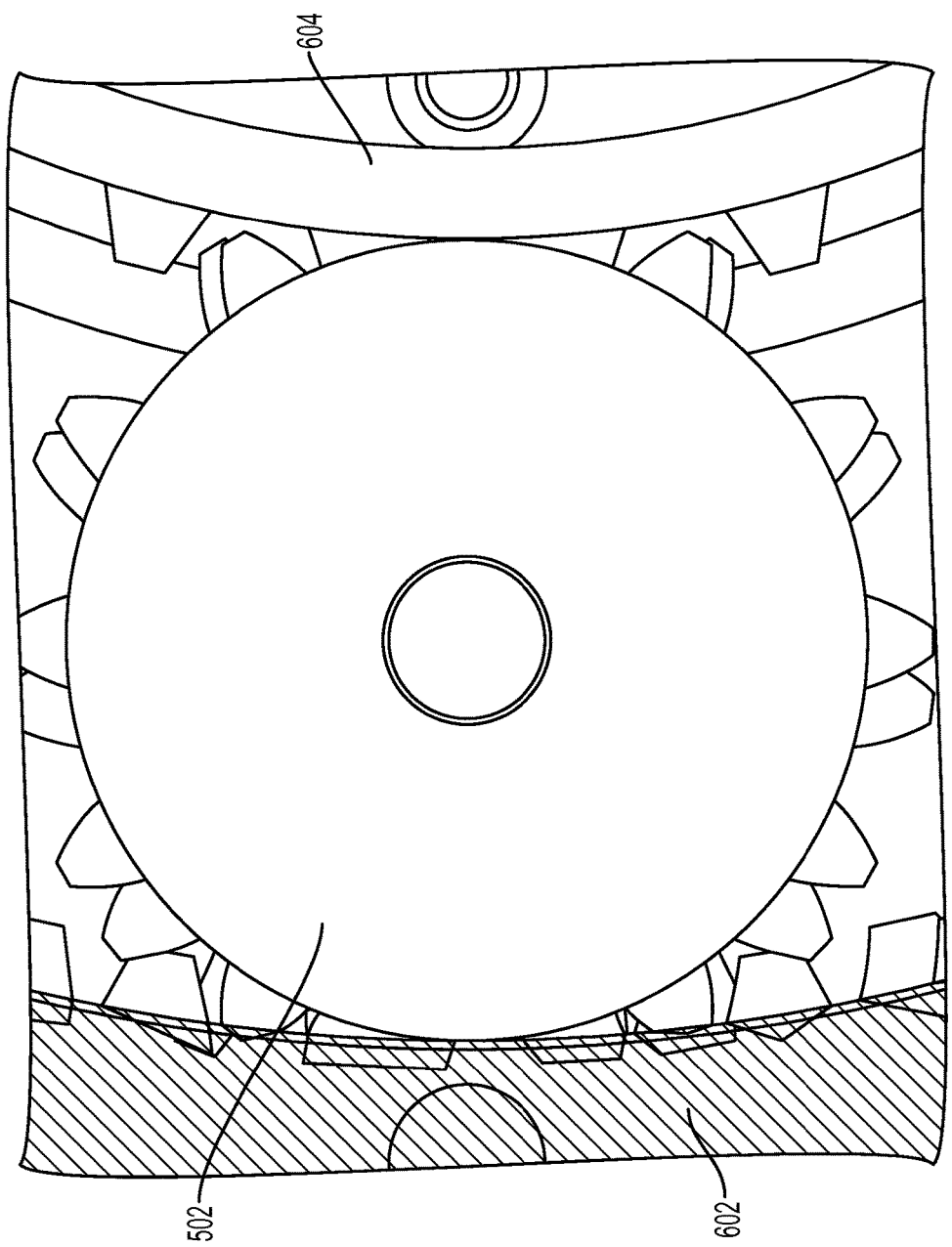
FIG. 17 is an expanded view of rollers in a gearbox with a pseudo ground, according to some embodiments of the present disclosure.

FIG. 17 is an expanded view of rollers in a gearbox with a pseudo ground, according to some embodiments of the present disclosure. FIG. 17 shows sun roller 604, planets roller 502, and ground ring 602. As discussed above, sun roller 604, planets roller 502, and ground ring roller 602 abut one another and help to maintain the gear alignment in the gearbox. In some embodiments, the planets roller 502 is attached to a face of a planet gear facing outward from the center of the actuator. In some embodiments, the diameter of the planets roller 502 is less than the diameter of the planet gear. In some embodiments, the diameter of the planets roller 502 is substantially equal to the pitch diameter.

FIG. 18 is an illustration showing a robotic arm in folded and extended positions, according to some embodiments of the present disclosure. The robotic arm design shown in FIG. 18 possesses both high payload-to-weight and a very compact profile, allowing the arm to perform exceptionally well in mobile deployment applications. One of the key enabling technology for the arm is its compact actuation system, such as the gearbox described in some embodiments of the present disclosure, which is able to supply high torques and provide a rigid joint structure, allowing the arm to manipulate heavy payloads with precision and dexterity. In some embodiments, the output ring actuates a link of the robotic arm. In some embodiments, the robotic link can be connected to a clamp, when a clamp is used to attach the two grounds in the actuator, as described above.

FIG. 19 shows tables with actuator parameters, according to some embodiments of the present disclosure. Given the significance of torque density in robotics, a parametric analysis was conducted on one embodiment of the gearbox described herein to evaluate its torque density for all possible gear ratios from −2000:1 to +2000:1 for a Safety Factor (SF) of 2. The governing kinematic equations are described in Brassitos, E., Mavroidis, M., Weinberg, B., "The Gear Bearing Drive: A Novel Compact Actuator for Robotic Joints." 2013 ASME Mechanisms and Robotics Conference, Proceedings of the International Design Engineering Technical Conferences and International Application No. PCT/US2014/031566. Ser. No. 11/821,095, entitled "Curved Bearing Contact System," filed Mar. 24, 2014, the disclosures of which are incorporated by reference herein. The analysis evaluated the safety factors on all the gear elements and iteratively solved for the maximum output torque to produce SF=2 on the weakest gear component using the teeth bending stress failure criteria.

The analysis returned approximately 50,000 combinations for the gearbox having rational gear ratios between −2000 to +2000 as shown in Table 1. Every row represents one configuration of the drive, ranked from highest to lowest gear ratio. The torque density is approximated from the maximum allowable torque and corresponding mechanism estimated weight.

Figure 20:
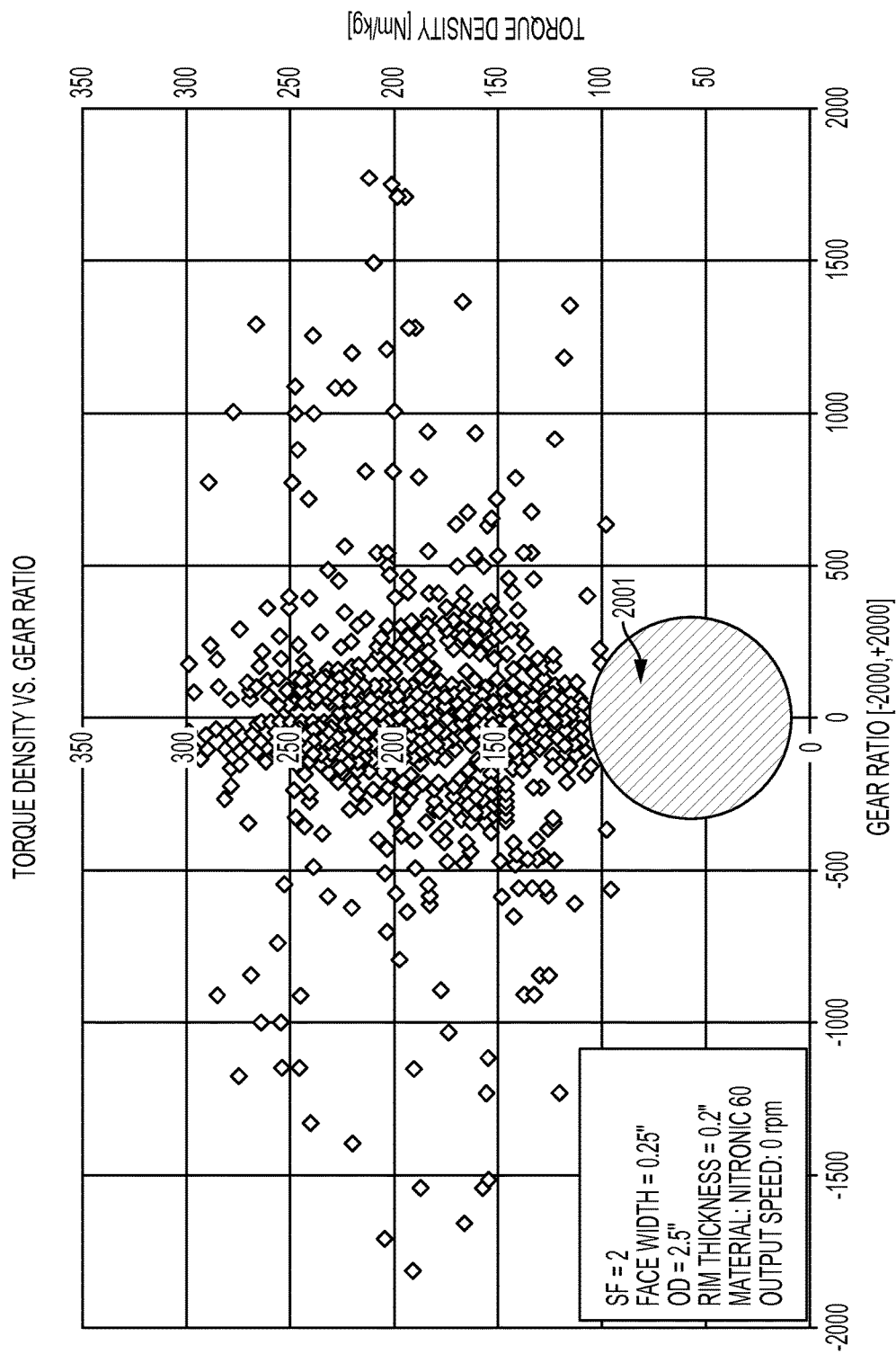
FIG. 20 is a graph showing combinations for the gearbox having rational gear ratios between −2000 to +2000 plotted against torque density, according to some embodiments of the present disclosure.
Figure 21:
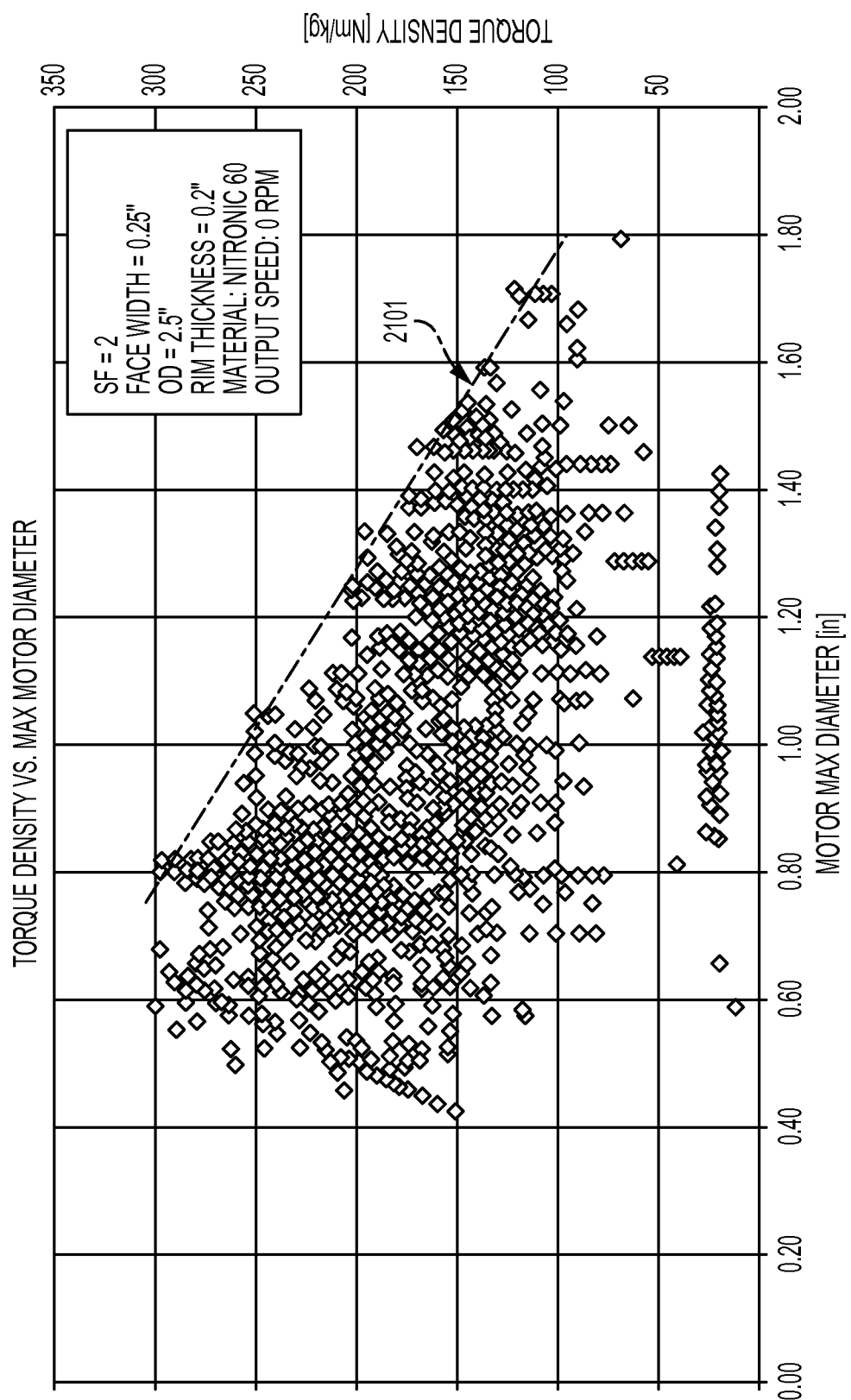
FIG. 21 is a graph showing torque density as a function of maximum motor diameter, according to some embodiments of the present disclosure.

FIG. 20 is a graph showing combinations for the gearbox having rational gear ratios between −2000 to +2000 plotted against torque density, according to some embodiments of the present disclosure. FIG. 21 is a graph showing torque density as a function of maximum motor diameter, according to some embodiments of the present disclosure. To compare the actuator concept torque density against standard high torque density actuators, all the permissible combinations from −2000 to +2000 ratio were plotted against their torque density as shown in FIG. 20. Every dot represents one configuration from Table 1, with harmonic drives approximated in the circular region 2001 for reference. The data was populated for generic output ring gear with a pitch diameter of 2.5" and face width of 0.25" that can be scaled based on the final application. To relate the motor requirements to each configuration, the torque density was populated as a function of motor diameter as shown in FIG. 21. The points shown along the dashed line 2101 represent the configurations having the highest torque density for the maximum allowable motor diameter.

Figure 22:
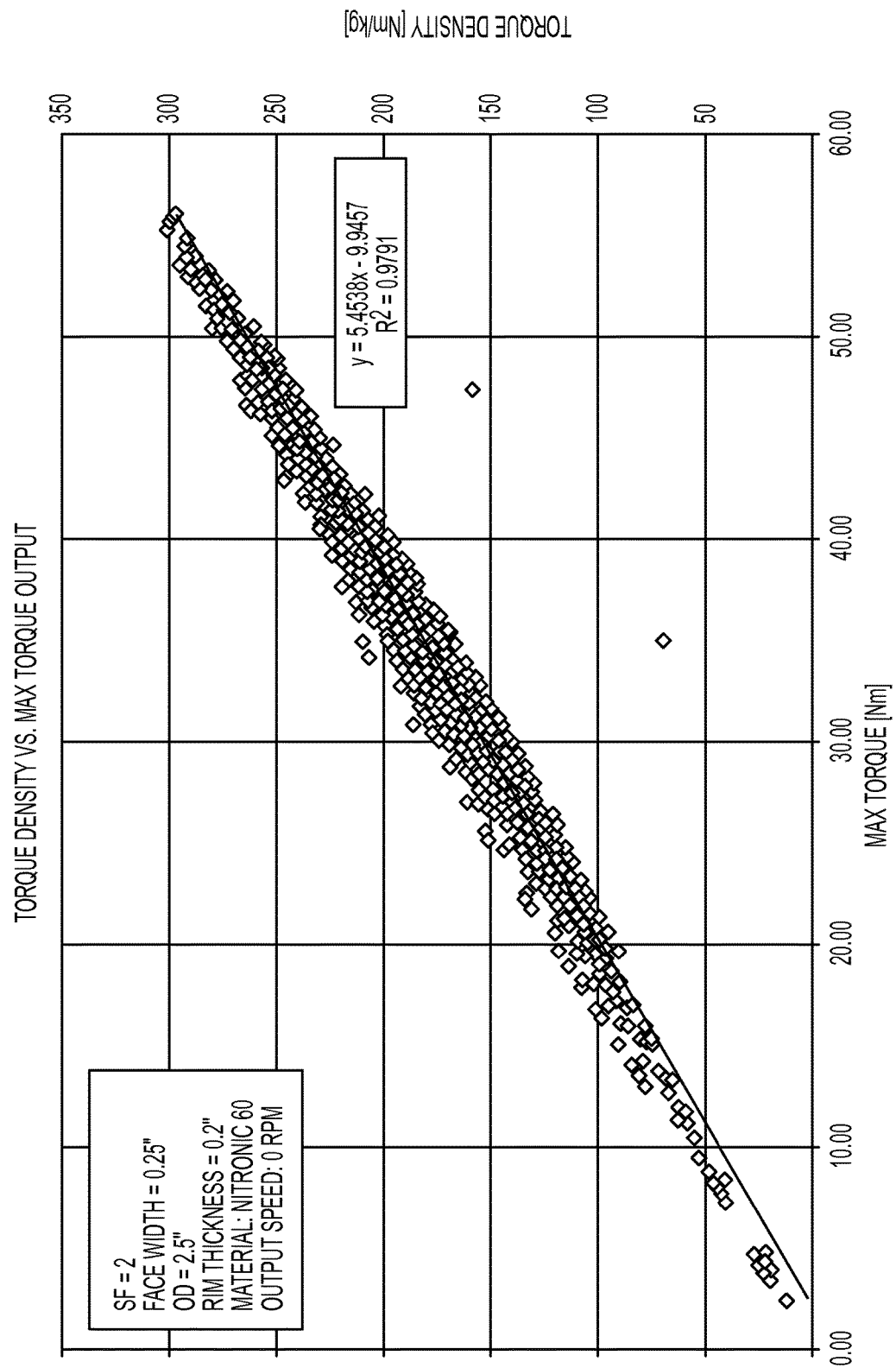
FIG. 22 is a graph showing a linear correlation between the maximum torque and torque density, according to some embodiments of the present disclosure.

FIG. 22 is a graph showing a linear correlation between the maximum torque and torque density, according to some embodiments of the present disclosure. The upper contour of the data represents the system configurations having the highest torque density for a given maximum torque. Based on the data, an actuator having the highest possible torque density for a diameter of 4.5" was selected, while considering system manufacturability and use of standard mechanical components in terms of bearings, seals and available motors.

FIG. 23 is a table listing system specifications, according to some embodiments of the present disclosure. The system specifications were derived from the data illustrated in FIGS. 19-22.

Figure 24:
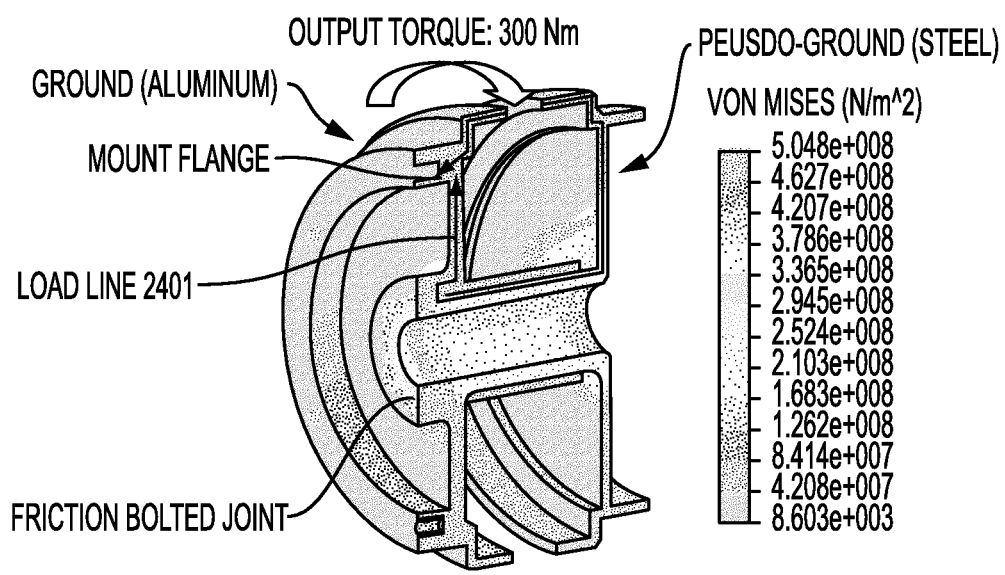
FIG. 24 is a graph showing Finite Element (FE) strength analysis performed on an actuator ground retaining structure, as described in some embodiments of the present disclosure.

FIG. 24 is a graph showing Finite Element (FE) strength analysis performed on an actuator ground retaining structure, as described in some embodiments of the present disclosure. The FE strength analysis calculated the actuator stresses under peak output torque of 300 Nm. Due to the double-shear design as described in some embodiments, the output torque is equally shared between the ground stages leading to low stresses throughout the retaining structure. The load line 2401 travels through the stiffer medium (pseudo-ground) into the central shaft and into the mounting flange without developing excessive stresses in the ground component.

Figure 25:
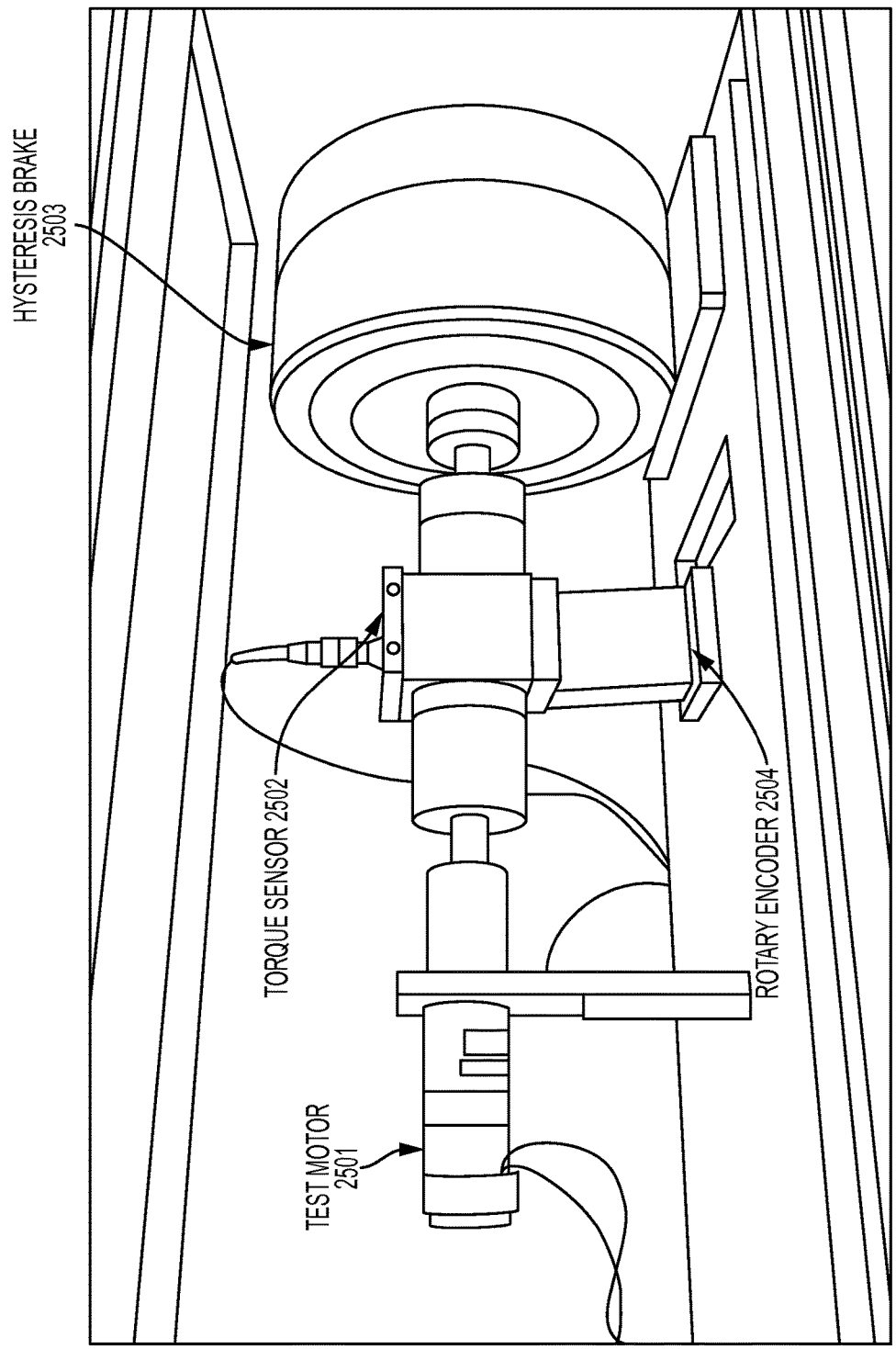
FIG. 25 is a diagram showing a dynamometer, according to some embodiments of the present disclosure.

FIG. 25 is a diagram showing a dynamometer, according to some embodiments of the present disclosure. FIG. 25 shows test motor 2501, torque sensor 2502, hysteresis brake 2503, and rotary encoder 2504.

A custom dynamometer comprising a dynamic torque sensor 2502, a hysteresis brake 2503 and high precision encoders 2504 can be used for the purpose of characterizing the actuator 2501 as described in certain embodiments. The dynamometer testing can be performed at ambient room conditions and comprises the following tests:

Torque vs. speed vs. efficiency profiling
Peak torque (maximum load capacity)
Backlash/minimum step
Gearing stiffness
Temperature rise As shown in FIG. 25, the dynamic torque sensor 2502 can be serially mounted between the actuator output and its load, allowing the direct measurement of torque and speed and position. The load can be created using a current-controlled hysteresis brake 2503. Two encoders mounted on the drive motor shaft and actuator output shaft can measure angular rotations with 1-arc-sec precision. The dynamometer test bed can be calibrated using a gear motor with known torque-speed-current performance specifications.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

We claim:

1. A balanced planetary gearbox including an assembly having an input stage and an output stage, the assembly comprising:
   a first ground, the first ground including a first ground ring and a first ground ring roller;
   a second ground, the second ground including a second ground ring and a second ground ring roller, the second ground fixedly connected to the first ground;
   a sun gear sub-assembly disposed between the first ground and the second ground, the sun gear sub-assembly including a sun gear and a sun roller, the sun gear including a first plurality of sun gear teeth and a second plurality of sun gear teeth;
   a plurality of planet sub-assemblies disposed to interface with and revolve around the sun gear sub-assembly and within the first ground ring and the second ground ring, each planet sub-assembly comprising at least one input planet gear and one output planet gear, each of the input gears including input gear teeth meshing with at least the first plurality of sun gear teeth or the second plurality of sun gear teeth, the at least one input planet gear including an input planet roller, the output gear coupled with at least one input planet gear, the output gear disposed in between the first plurality of sun gear teeth and the second plurality of sun gear teeth, wherein the first and second ring rollers abut their respective input gear rollers and the sun roller; and
   an output ring disposed to mesh with the output planet gear of each planet sub-assembly, the output ring gear disposed in between the first ground ring and the second ground ring, such that a combination of the input planet gears from each of the plurality of planet sub-assemblies provides a structural symmetry to the planetary gearbox.

2. The balanced planetary gearbox of claim 1, wherein the second ground is fixedly connected to the first ground by a central shaft.

3. The balanced planetary gearbox of claim 1, wherein the second ground is fixedly connected to the first ground by a clamp external to the planetary gearbox.

4. The balanced planetary gearbox of claim 1, wherein the sun gear sub-assembly further comprises a motor having an external rotor and motor coils with an air gap defining a distance between the external rotor and the motor coils, the external rotor disposed inside an interior region of the sun gear and concentrically surrounded by the first plurality of sun gear teeth and the second plurality of sun gear teeth, the sun gear rotatable with the external rotor.

5. The balanced planetary gearbox of claims 2 and 4, wherein the motor coils are affixed to an exterior of the central shaft.

6. The balanced planetary gearbox of claims 3 and 4, wherein the motor coils are affixed to the first ground.

7. The balanced planetary gearbox of claim 1, further comprising a first bearing disposed between the output gear and the first ground and a second bearing disposed between the output gear and the second ground such that the output gear is constrained by the two bearings in a radial direction and a thrust direction.

8. The balanced planetary gearbox of claim 7, wherein the first bearing and the second bearing comprise at least one of angular-angular bearings, taper-taper bearings, taper-thrust bearings, and angular-thrust bearings.

9. The balanced planetary gearbox of claim 7, wherein the first bearing and the second bearing are pre-loaded.

10. The balanced planetary gearbox of claim 1, further comprising a heat sink attached to the first ground plate.

11. The balanced planetary gearbox of claim 1, wherein each of the planet sub-assemblies includes a first input planet gear and a second input planet gear.

12. The balanced planetary gearbox of claim 1, wherein a diameter of the first input planet gear is substantially equal to the diameter of the second input planet gear.

13. The balanced planetary gearbox of claim 1, wherein the balanced planetary gearbox is cylindrical and a diameter of the balanced planetary gearbox ranges from 2.5 inch to 6 inches and a height of the balanced planetary gearbox ranges from 1 inches to 3 inches.

14. The balanced planetary gearbox of claim 1, wherein the first ground ring is constrained by a first ground sleeve and the second ground ring is constrained by a second ground sleeve.

15. The balanced planetary gearbox of claim 14, wherein the first ground sleeve is attached to the first ground and the second ground sleeve is attached to the second ground.

16. The balanced planetary gearbox of claim 1, wherein the first ground ring is embedded in the first ground, and the second ground ring is embedded in the second ground.

17. The balanced planetary gearbox of claim 1, wherein the balanced planetary gearbox includes a sensing system to determine a position of the sun gear relative to the first ground.

18. The balanced planetary gearbox of claim 17, wherein the sensing system comprises a grating disk disposed on the sun gear and a sensor disposed on the first ground, the sensor configured to locate a position of the sun gear relative to the first ground by sensing a position signature of the grating disk.

19. The balanced planetary gearbox of claim 18, wherein the sensor is a Hall effect sensor.

20. The balanced planetary gearbox of claim 1, wherein the output ring actuates a link of a robotic arm.

21. The balanced planetary gearbox of claim 3, wherein the clamp can be connected to a robotic link.

22. A balanced gear bearing drive including an assembly having an input stage and an output stage, the assembly comprising:
   a first ground including a first ground plate, a first ground ring and a first ground roller, the first ground ring and the first ground roller disposed near a radially outward edge of the first ground plate;

a second ground including a second ground plate, a second ground ring and a second ground roller, the second ground ring and the second ground roller disposed near a radially outward edge of the second ground plate, the second ground plate fixedly connected in parallel to the first ground plate by a central shaft; a sun gear sub-assembly, the sun gear sub-assembly located between the first ground plate and the second ground plate, the sun gear sub-assembly comprising:

a sun gear including:
  a first plurality of sun gear teeth and an associated first sun roller, and a second plurality of sun gear teeth and an associated second sun roller, the second plurality of sun gear teeth and the second sun roller parallel to the first plurality of sun gear teeth and the first sun roller, the first plurality of sun gear teeth and the second plurality of sun gear teeth extending radially outwardly and disposed circumferentially around the sun gear, and
  a motor having an external rotor and motor coils with an air gap defining a distance between the external rotor and the motor coils, the external rotor disposed inside an interior region of the sun gear and concentrically surrounded by the first plurality of sun gear teeth and the second plurality of sun gear teeth, the sun gear rotatable with the external rotor, and the motor coils affixed to the exterior of the central shaft;

a plurality of planet sub-assemblies disposed to interface with and revolve around the sun gear sub-assembly and disposed to interface with and revolve within the first ground ring and the second ground ring, each planet sub-assembly comprising:
  a first input gear including a first plurality of input planet gear teeth and a first input planet roller, the first plurality of input planet gear teeth extending radially outwardly and disposed circumferentially around the first input gear,
  a second input gear including a second plurality of input planet gear teeth and a second input planet roller, the second plurality of input planet gear teeth extending radially outwardly and disposed circumferentially around the second input gear, the second input planet gear parallel to the first input planet gear, wherein the first plurality of input planet gear teeth meshes with the first plurality of sun gear teeth, and the second plurality of input planet gear teeth meshes with the second plurality of input planet gear teeth, and the first input planet roller contacts and is disposed in between the first sun roller and the first ground roller, and the second input planet roller contacts and is disposed in between the second sun roller and the second ground roller, and
  an output planet gear, the output planet gear disposed in between the first input gear and the second input gear, the output planet gear including a plurality of output gear teeth and an output gear roller, the plurality of output planet gear teeth extending radially outwardly and disposed circumferentially around the output planet gear; and an output ring disposed to mesh with the output planet gear of each planet sub-assembly, the output ring gear disposed in between the first ground ring and the second ground ring.

23. A frictionless planetary carrier comprising an assembly having an input side and an output side, the assembly comprising:
  a central shaft including a pressurized air feed;
  a plurality of planet sub-assemblies disposed radially outward from the central shaft, each of the plurality of planet sub-assemblies connected to the input side and to the output side by a bolt, wherein a first portion of the bolt is threaded and connected to a threaded carrier member disposed on the input side thereby forming a substantially airtight connection, and a second portion of the bolt is smooth and a connected to a carrier member on the output side thereby allowing air to pass between the carrier member and the bolt, each of the planet sub-assemblies further comprising:
    a planet gear disposed to revolve around the bolt, and airbushing disposed between the bolt and an interior region of the planet gear; and
  an air channel disposed in the output member connecting the pressurized airfeed with each of planet sub-assemblies, such that pressurized air in contact with the airbushing creates a frictionless surface between the planet gear and airbushing.

24. The frictionless planetary carrier of claim 23, further comprising a motor having an external rotor and motor coils, wherein the motor coils are affixed to the exterior of the central shaft.

25. The frictionless planetary carrier of claim 24, wherein the pressurized air feed feeds into the motor coils, such that the pressurized air feed cools the motor coils.

* * * * *